United States Patent
Kim et al.

(10) Patent No.: US 9,380,559 B2
(45) Date of Patent: Jun. 28, 2016

(54) METHOD AND APPARATUS FOR TRANSMITTING MULTICAST DATA TO M2M DEVICES IN A WIRELESS ACCESS SYSTEM

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 14/116,583

(22) PCT Filed: May 8, 2012

(86) PCT No.: PCT/KR2012/003596
§ 371 (c)(1),
(2), (4) Date: Nov. 8, 2013

(87) PCT Pub. No.: WO2012/153971
PCT Pub. Date: Nov. 15, 2012

(65) Prior Publication Data
US 2014/0092801 A1    Apr. 3, 2014

Related U.S. Application Data

(60) Provisional application No. 61/483,718, filed on May 8, 2011, provisional application No. 61/486,782, filed on May 17, 2011, provisional application No. 61/504,232, filed on Jul. 3, 2011.

(51) Int. Cl.
*H04W 68/02* (2009.01)
*H04L 12/18* (2006.01)
(Continued)

(52) U.S. Cl.
CPC ........... *H04W 68/02* (2013.01); *H04L 12/1877* (2013.01); *H04W 4/005* (2013.01); *H04W 4/06* (2013.01); *H04L 12/189* (2013.01); *H04W 68/025* (2013.01); *H04W 76/002* (2013.01)

(58) Field of Classification Search
USPC .................................................. 370/310–312
See application file for complete search history.

(56) References Cited

U.S. PATENT DOCUMENTS

| 7,505,776 B2 * | 3/2009 | Ryu | H04W 68/00 455/127.5 |
| 8,532,671 B2 * | 9/2013 | Park | H04W 60/04 455/456.1 |

(Continued)

FOREIGN PATENT DOCUMENTS

KR    WO 2010071312 A2 *    6/2010    ............ H04W 60/04

OTHER PUBLICATIONS

ETRI, "Device ID and Group ID for M2M Devices," IEEE 802.16 Broadband Wireless Access Working Group, IEEE 802.16p-11/0019, Mar. 2011, 20 pages (relevant portions: pp. 6-9 and 14).

(Continued)

*Primary Examiner* — Bob Phunkulh
*Assistant Examiner* — Kyaw Z Soe
(74) *Attorney, Agent, or Firm* — Lee, Hong, Degerman, Kang & Walmey; Jonathan Kang; Michael Monaco

(57) ABSTRACT

The present invention relates to a method for transmitting multicast data to M2M devices, to a method for transmitting a reliable MAC control message, and to devices for supporting the methods. The method for receiving multicast data by an idle-mode M2M device in a wireless access system comprises the following steps: receiving a paging group identifier information message, including a multicast traffic indication (MTI) field indicating whether a paging message is transmitted; monitoring a paging frame for receiving the paging message in a paging listening period in an idle mode; if the paging message is not received in the paging frame, transmitting a ranging request message including an M2M operation code and an M2M group identifier; and receiving a ranging response message, including an M2M response code and a multicast transmission start time (MTST) field.

12 Claims, 12 Drawing Sheets

(51) Int. Cl.
*H04W 4/00* (2009.01)
*H04W 4/06* (2009.01)
*H04W 76/00* (2009.01)

(56) References Cited

U.S. PATENT DOCUMENTS

| | | | | |
|---|---|---|---|---|
| 2005/0250474 | A1* | 11/2005 | Hong | H04W 60/04 455/411 |
| 2005/0254444 | A1 | 11/2005 | Meier et al. | |
| 2006/0009242 | A1* | 1/2006 | Ryu | H04W 68/00 455/458 |
| 2006/0025134 | A1* | 2/2006 | Cho | H04W 60/06 455/435.1 |
| 2008/0232293 | A1* | 9/2008 | Mooney | H04W 68/025 370/312 |
| 2010/0069062 | A1* | 3/2010 | Horn | H04W 68/04 455/434 |
| 2010/0081454 | A1* | 4/2010 | Wang | H04W 68/02 455/456.1 |
| 2010/0167747 | A1* | 7/2010 | Karnam | H04L 29/12273 455/450 |
| 2010/0273512 | A1* | 10/2010 | Wang | H04W 68/06 455/458 |
| 2012/0034918 | A1* | 2/2012 | Park | H04W 60/06 455/435.1 |
| 2012/0214520 | A1* | 8/2012 | Bergqvist | H04W 68/02 455/458 |
| 2013/0252643 | A1* | 9/2013 | Park | H04W 8/24 455/458 |
| 2013/0281134 | A1* | 10/2013 | Park | H04W 68/00 455/458 |
| 2013/0310016 | A1* | 11/2013 | Park | H04W 28/18 455/418 |
| 2014/0031063 | A1* | 1/2014 | Park | H04W 4/005 455/456.1 |

OTHER PUBLICATIONS

ETRI, "Distribution of Initial Ranging Access for Network Reentry," IEEE 802.16 Broadband Wireless Access Working Group, IEEE C802.16p-11/0020, Mar. 2011, 16 pages (relevant pages: p. 5).

LG Electronics, "Proposed text for network reentry procedure of fixed M2M device," IEEE 802.16 Broadband Wireless Access Working Group, IEEE C802.16p-11/0018r1, Mar. 2011, 6 pages.

PCT International Application No. PCT/KR2012/003596, Written Opinion of the International Searching Authority dated Nov. 20, 2012, 16 pages.

* cited by examiner

METHOD AND APPARATUS FOR TRANSMITTING MULTICAST DATA TO M2M DEVICES IN A WIRELESS ACCESS SYSTEM

CROSS-REFERENCE TO RELATED APPLICATIONS

This application is the National Stage filing under 35 U.S.C. 371 of International Application No. PCT/KR2012/003596, filed on May 8, 2012, which claims the benefit of U.S. Provisional Application Ser. No. 61/483,718, filed on May 8, 2011, 61/486,782, filed on May 17, 2011, and 61/504,232, filed on Jul. 3, 2011, the contents of which are all hereby incorporated by reference herein in their entirety.

TECHNICAL FIELD

The present invention relates to a wireless access system supporting a machine to machine (M2M) environment and, more particularly, to a method of transmitting multicast data to M2M devices, a method of transmitting a reliable medium access control (MAC) control message, and an apparatus supporting the same.

BACKGROUND ART

Hereinafter, a machine to machine communication environment in the present invention will be briefly described.

Machine to Machine (M2M) communication refers to communication between electronic devices in the literal sense of the word. In a broad sense, M2M communication means wired or wireless communication between electronic devices or communication between a human-controlled device and a machine. Recently, M2M communication has come to refer to wireless communication between electronic devices performed without human intervention.

In the early 1990s when the concept of M2M communication was first introduced, M2M communication was recognized as remote control, telematics, or so and a market derived therefrom was very limited. However, as M2M communication has rapidly developed in the past few years, a market for the same has vastly expanded, attracting worldwide attention. In particular, M2M communication has exerted an important influence on the field of fleet management in a Point Of Sales (POS) system and a security related application market, remote monitoring of machines or facilities, and smart meter for measuring operating time of mechanical construction equipment and automatically measuring consumption of heat or electricity. In the future, M2M communication will be extended to various applications in association with existing mobile communication, wireless high-speed Internet, and low-output communication solutions such as Wi-Fi and Zig-Bee. That is, M2M communication will evolve from Business to Business (B2B) markets to Business to Consumer (B2C) markets.

In the era of M2M communication, all machines equipped with a Subscriber Identity Module (SIM) card can transmit and receive data so that the machines can be remotely managed and controlled. For example, M2M communication technology can be used for numerous machines and equipment such as automobiles, trucks, trains, containers, vending machines, gas tankers, etc. and the variety of applications thereof will continue to expand.

Conventionally, mobile stations were managed individually for one-to-one communication between a base station and a mobile station. On the assumption that numerous M2M devices communicate with the base station through one-to-one communication, network overload is likely to occur due to signaling generated between each of the M2M devices and the base station. As M2M communication rapidly spreads and expands as described above, an overhead problem may occur due to communication between the M2M devices or between the M2M devices and a base station.

In addition, as use of the M2M devices is activated, there is generated an environment in which general mobile stations and the M2M devices coexist. In a case in which the existing communication method is used without change, therefore, it may be necessary for the general mobile stations to decode all messages for the M2M devices.

In addition, in order to transmit multicast data for the M2M devices, the base station transmits a paging message to the M2M devices in a state of including an M2M group identifier and multicast related information in the paging message. In a case in which the M2M devices do not receive a MAP information element (IE) or an error occurs when a corresponding paging message is decoded, however, the M2M devices may not receive the multicast data.

In addition, in a case in which the M2M devices cannot receive a paging group identifier information message and/or a paging message due to change of a paging group to which the M2M devices belong, the M2M devices may not receive multicast data/unicast data.

DISCLOSURE

Technical Problem

The present invention has been made in view of general technical problems as described above and it is an object of the present invention to provide a method of transmitting multicast data for M2M devices.

It is another object of the present invention to provide a method of reliably transmitting multicast related information for transmission of multicast data for M2M devices.

It is another object of the present invention to provide a method of reliably transmitting control information for transmission of unicast data for M2M devices.

It is a further object of the present invention to provide a method of reliably transmitting control information for transmission of multicast/unicast data even in a case in which a paging group to which M2M devices belong is changed.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In order to solve the above technical problems, a method of transmitting multicast data to machine to machine (M2M) devices, a method of transmitting a reliable medium access control (MAC) control message, and an apparatus supporting the same are disclosed.

In an aspect of the present invention, a method of an M2M device in an idle mode receiving multicast data in a wireless access system may include receiving a paging group identifier information message including a multicast traffic indication (MTI) field indicating whether a paging message including control information associated with the multicast data is transmitted, monitoring a paging frame to receive the paging message in a paging listening interval of the idle mode of the M2M device, upon not receiving the paging message in the paging frame, transmitting a ranging request message including an M2M action code for confirming whether the paging message has been transmitted and an M2M group identifier for identifying an M2M group to which the M2M device belongs, and receiving a ranging response message including an M2M response code indicating whether the paging message has been transmitted and a multicast transmission start time (MTST) field indicating a transmission start time when multicast data are transmitted.

In another aspect of the present invention, a method of transmitting multicast data to an M2M device in an idle mode in a wireless access system may include transmitting a paging group identifier information message including a multicast traffic indication (MTI) field indicating whether a paging message including control information associated with the multicast data is transmitted, transmitting the paging message, receiving a ranging request message including an M2M action code for confirming whether the paging message has been transmitted and an M2M group identifier for identifying an M2M group to which the M2M device belongs from the M2M device having not received the paging message, and transmitting a ranging response message including an M2M response code indicating that the paging message has been transmitted and a multicast transmission start time (MTST) field indicating a transmission start time when multicast data are transmitted.

In a further aspect of the present invention, an M2M device for receiving multicast data in a wireless access system may include a transmitting module, a receiving module, and a processor supporting reception of the multicast data.

In this case, the M2M device may receive a paging group identifier information message including a multicast traffic indication (MTI) field indicating whether a paging message including control information associated with the multicast data is transmitted through the receiving module, monitor a paging frame using the processor to receive the paging message in a paging listening interval of an idle mode, upon not receiving the paging message in the paging frame, transmit a ranging request message including an M2M action code for confirming whether the paging message has been transmitted and an M2M group identifier for identifying an M2M group to which the M2M device belongs through the transmitting module, and receive a ranging response message including an M2M response code indicating whether the paging message has been transmitted and a multicast transmission start time (MTST) field indicating a transmission start time when multicast data are transmitted through the receiving module.

In the above aspects of the present invention, the paging group identifier information message may further include the M2M group identifier.

The MTI field may indicate in which frame the paging message is transmitted in a bitmap form.

The ranging request message may further include a ranging purpose indication field indicating that the ranging request message is transmitted for location update associated with M2M multicast operation.

The MTST field may indicate one selected from among a superframe number, a frame number, and a subframe number.

The above aspects of the present invention are merely some of exemplary embodiments of the present invention and various embodiments into which the technical features of the present invention are incorporated may be derived and understood by those skilled in the art from the detailed description of the present invention which follows.

Advantageous Effects

Embodiments of the present invention have the following effects.

First, it is possible to transmit multicast data only to M2M devices in a situation in which general mobile stations and the M2M devices coexist.

Second, it is possible to reliably transmit multicast related control information for multicast data transmission to M2M devices.

Third, it is possible to reliably transmit control information for unicast data transmission to M2M devices.

Fourth, it is possible to reliably transmit control information for multicast/unicast data transmission even in a case in which a paging group including M2M devices is changed.

Additional advantages, objects, features of the present invention will be easily understood from the following detailed description or implementation of the present invention performed by those skilled in the art based on the following description. In addition, the present invention may have unexpected advantages, which may be obtained by implementation of the present invention performed by those skilled in the art based on the following description.

DESCRIPTION OF DRAWINGS

The accompanying drawings provide embodiments of the invention together with the description to help the understanding of the present invention. However, technical features of the present invention are not limited to the accompanying drawings and features disclosed in the respective drawings may be combined to constitute new embodiments.

BEST MODE

Figure 1:
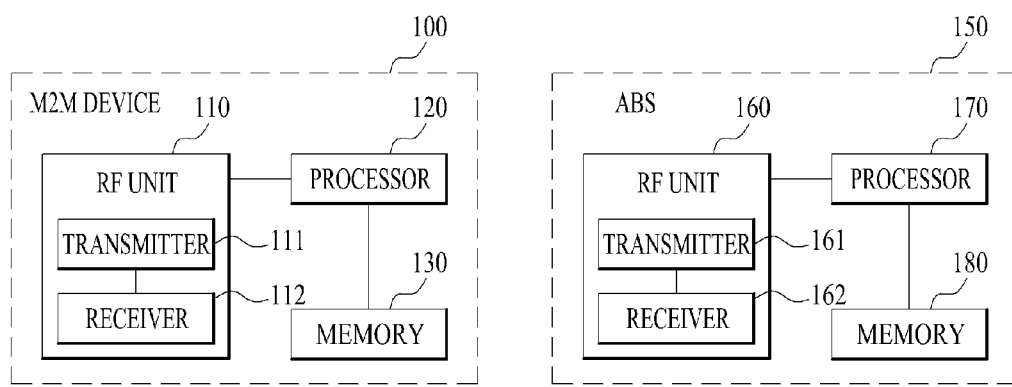
FIG. 1 is a view schematically illustrating configurations of an M2M device and a base station according to an embodiment of the present invention.

Embodiments of the present invention provide a method and apparatus for broadcasting a medium access control (MAC) control message in a wireless access system supporting a machine to machine (M2M) environment.

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the attached drawings, procedures or steps will not be described if they may obscure the subject matter of the present invention. In addition, procedures or steps easily understood by those skilled in the art will also not be described.

In the disclosure, embodiments of the present invention are described focusing upon a relationship of data transmission and reception between a base station and a mobile station. Here, the base station refers to a terminal node of a network communicating directly with the mobile station. In the disclosure, a specific operation described as being performed by the base station may be performed by an upper node of the base station according to circumstances.

That is, in a network comprised of a plurality of network nodes including the base station, various operations performed for communication with the mobile station may be performed by the base station or network nodes other than the base station. The term 'base station' may be replaced with the terms fixed station, Node B, eNode B (eNB), Advanced Base Station (ABS), access point, etc.

In addition, the term 'mobile station (MS)' may be replaced with the terms User Equipment (UE), Subscriber Station (SS), Mobile Subscriber Station (MSS), Mobile Terminal, Advanced Mobile Station (AMS), Terminal, etc. In particular, the mobile station may have the same meaning as an M2M device in the present invention.

In addition, a transmitting end refers to a fixed and/or mobile node for providing a data service or a voice service and a receiving end refers to a fixed and/or mobile node for receiving a data service or a voice service. Consequently, the mobile station may be the transmitting end and the base station may be the receiving end on an uplink. On the other hand, the mobile station may be the receiving end and the base station may be the transmitting on a downlink.

Embodiments of the present invention may be supported by standard documents disclosed in at least one selected from among wireless access systems, such as an Institute of Electrical and Electronics Engineers (IEEE) 802.xx system, a 3rd generation partnership project (3GPP) system, a 3GPP long term evolution (LTE) system, and a 3GPP2 system. That is, in the embodiments of the present invention, steps or parts, description of which will be omitted in order to clarify the technical spirit of the present invention, may be supported by the above standard documents.

In addition, all terms disclosed herein may be supported by the above standard documents. In particular, embodiments of the present invention may be supported by at least one selected from among P802.16e-2004, P802.16e-2005, P802.16m, P802.16p, and P802.16.1b standard documents, which are standard documents of a IEEE 802.16 system.

Hereinafter, embodiments of the present invention will be described in detail with reference to the accompanying drawings. The following detailed description given together with the accompanying drawings reveals illustrative embodiments of the present invention but does not reveal the only embodiment based on the present invention can be implemented.

Reference will now be made in detail to the embodiments of the present invention, examples of which are illustrated in the accompanying drawings such that the present invention can be easily implemented by a person having an ordinary skill in the art to which the present invention pertains. However, the present invention may be implemented in various different forms and is not limited to the following embodiments. Parts of the drawings irrelevant to the description of the present invention are omitted to clearly explain the present invention. The same reference numbers will be used throughout this specification to refer to the same or like parts.

In a case in which a part "includes" a component through this specification, this means that the part may not exclude another component but may further include another component unless otherwise mentioned. In addition, the terms "unit", "---or (or ---er)", "module", etc. described in this specification mean an element for processing at least one function or operation. This element may be implemented by hardware, software, or a combination of the hardware and the software.

In addition, specific terms used for the embodiments of the present invention are provided to help the understanding of the present invention. These specific terms may be replaced with other terms within the technical concept of the present invention.

For example, in embodiments of the present invention, a Multicast Traffic Indication (MTI) field may have the same meaning as a Multicast Paging Message Indication field and a Reliable Traffic Indication (RTI) field may have the same meaning as a Reliable Paging Message Indication field. In addition, the term "traffic" may have the same meaning as the term "data" and, therefore, the terms "traffic" and "data" may be used interchangeably.

1. Outline of M2M Devices

In the following description, communication between M2M devices refers to communication between mobile stations via a base station or between a base station and mobile stations without human intervention or communication between the M2M devices. Accordingly, an M2M device refers to a mobile station which can support communication between the M2M devices as described above.

An Access Service Network for an M2M service is defined as an M2M Access Service Network (M2M ASN) and a network entity communicating with M2M devices is called an M2M server. The M2M server executes an M2M application and provides an M2M specific service for one or more M2M devices. M2M features indicate features of an M2M application and one or more features may be necessary to provide the application. An M2M device group refers to a group of M2M devices which share one or more features in common.

Devices performing communication according to an M2M scheme (which may be referred to as M2M devices, M2M communication devices, Machine Type Communication (MTC) devices, etc.) in a given network will increase in number as machine application types thereof increase.

The machine application types include (1) security, (2) public safety, (3) tracking and tracing, (4) payment, (5) healthcare, (6) remote maintenance and control, (7) metering, (8) consumer device, (9) fleet management in a Point Of Sales (POS) system and a security related application market, (10) M2M communication of a vending machine, (11) remote monitoring of machines or facilities and smart meter for measuring operating time of mechanical construction equipment and automatically measuring consumption of heat or electricity, and (12) surveillance video communication of a surveillance camera. However, the machine application types are not limited thereto and various other machine application types may be applied.

Another feature of M2M devices is that the M2M devices have low mobility or have little mobility once installed. This means that the M2M devices are stationary for a considerably long time. An M2M communication system may simplify or optimize mobility related operations for a specific M2M application having a fixed location, such as secured access and surveillance, public safety, payment, remote maintenance and control, and metering.

As the machine application types increase, therefore, the number of M2M communication devices may rapidly increase as compared to the number of general mobile communication devices. Accordingly, in a case in which each of the M2M devices individually communicates with a base station, a wireless interface and/or network may be subjected to severe load.

Hereinafter, embodiments of the present invention will be described on the assumption that M2M communication is applied to a wireless communication system (e.g. P802.16e, P802.16m, P802.16.1b, P802.16p, etc.). However, the present invention is not limited by the embodiments and is applicable to other communication systems such as a 3GPP LTE/LTE-A system.

FIG. 1 is a view schematically illustrating configurations of an M2M device and a base station according to an embodiment of the present invention.

In FIG. 1, an M2M device 100 and a base station 150 may include radio frequency (RF) units 110 and 160, processors 120 and 170, and, as optional units, memories 130 and 180, respectively. FIG. 1 shows one M2M device and one base station. However, an M2M communication environment may be configured between a plurality of M2M devices and a base station.

The RF units 110 and 160 may include transmitters 111 and 161 and receivers 112 and 162, respectively. The transmitter 111 and the receiver 112 of the M2M device 100 may be configured so as to transmit signals to and receive signals from the base station 150 and other M2M devices. The processor 120 may be functionally connected to the transmitter 111 and the receiver 112 to control signal transmission and reception to and from other devices through the transmitter 111 and the receiver 112. The processor 120 may process a signal to be transmitted and then transmit the processed signal to the transmitter 111. In addition, the processor 120 may also process a signal received by the receiver 112.

When needed, the processor 120 may store information included in an exchanged message in the memory 130. The M2M device 100 having the above-described configuration may perform methods according to various embodiments of the present invention described below.

Meanwhile, although not shown in FIG. 1, the M2M device 100 may include many additional components according to a machine application type thereof. For example, in a case in which the M2M device 100 is designed for smart metering, the M2M device 100 may further include a component for power measurement. Such power measuring operation may be controlled by the processor 120 of FIG. 1 or a separately configured processor (not shown).

Although communication is performed between the M2M device 100 and the base station 150 in the shown case of FIG. 1, M2M communication according to the present invention may also be performed between one or more M2M devices. Each device having the same configuration as shown in FIG. 1 may perform methods according to various embodiments of the present invention described below.

The transmitter 161 and the receiver 162 of the base station 150 may be configured to transmit signals to and receive signals from another base station, an M2M server, and M2M devices. The processor 170 may be functionally connected to the transmitter 161 and the receiver 162 to control signal transmission and reception to and from other devices through the transmitter 161 and the receiver 162. The processor 170 may process a signal to be transmitted and then transmit the processed signal to the transmitter 161. In addition, the processor 170 may also process a signal received by the receiver 162. When needed, the processor 170 may store information included in an exchanged message in the memory 130. The base station 150 having such a configuration may perform methods according to various embodiments of the present invention described above.

The processors 120 and 170 of the M2M device 110 and the base station 150 command (e.g. control, adjust, and manage) operations of the M2M device 110 and the base station 150, respectively. The processors 120 and 170 may be connected respectively to the memories 130 and 180 that store program code and data. The memories 130 and 180 are connected respectively to the processors 120 and 170 to store an operating system, applications, and general files.

The processors 120 and 170 of the present invention may also be called controllers, microcontrollers, microprocessors, or microcomputers. Meanwhile, the processors 120 and 170 may be implemented by hardware, firmware, software, or a combination thereof. In a hardware configuration, the processors 120 and 170 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In a firmware or software configuration, on the other hand, the firmware or the software may be configured to include a module, a procedure, a function, etc. for performing functions or operations of the present invention. The firmware or the software configured to implement the present invention may be included in the processors 120 and 170 or may be stored in the memories 130 and 180 such that the firmware or the software can be executed by the processors 120 and 170.

2. Idle Mode

Hereinafter, a description will be given of an idle mode in an M2M environment in which embodiments of the present invention will be performed.

An idle mode is a mode using a Paging Group, a Paging Cycle, and a Paging Offset for power saving in a case in which an M2M device (i.e. mobile station) does not receive traffic for a predetermined time.

For example, a mobile station transit to an idle mode may receive a broadcast message (e.g. a paging message) broadcast by a base station only during a paging available internal (or a paging listening interval) of a paging cycle to determine whether the mobile station will transit to a normal mode or remains in the idle mode.

In addition, the idle mode is a mechanism in which a mobile station may periodically receive a downlink message without registration with a specific base station (i.e. without execution of handover) even when the mobile station wanders about a wireless link environment having a plurality of base stations over a wide area.

The idle mode will be described based on an IEEE 802.16e/16m/16p system for the convenience of description. However, the technical concept of the present invention is not limited thereto. In order to enter the idle mode, the mobile station transmits a Deregistration Request (DREG-REQ) message for requesting deregistration from the base station to the base station.

Subsequently, the base station transmits a Deregistration Response (DREG-RSP) message to the mobile station in response to the DREG-REQ message. At this time, the DREG-RSP message includes paging information. Entry of the mobile station into the idle mode may be initiated according to a request of the base station (in an unsolicited manner). In this case, the base station transmits the DREG-RSP message to the mobile station.

The paging information may include a Paging Cycle, a Paging Offset, a Paging Group IDentifier (PGID), and a Paging Listening Interval value.

The mobile station, having received the DREG-RSP message from the base station, enters the idle mode with reference to the paging information. The idle mode has a paging cycle. One paging cycle may include a paging listening interval and an unavailable interval. At this time, the paging listening interval may be used as the same concept as an available interval or a paging interval.

The paging offset indicates a time (e.g. a frame or a subframe) when the paging listening interval starts in the paging cycle. In addition, the paging group identifier indicates an identifier of a paging group assigned to the mobile station. In addition, the paging information may include paging message offset information. The paging message offset information indicates a time when a paging message is transmitted from the base station.

Subsequently, the mobile station may receive a paging message transmitted thereto in the paging listening interval using the paging information. The paging message may be transmitted through the base station or a paging controller. That is, the mobile station monitors a wireless channel according to the paging cycle in order to receive the paging message.

Figure 2:
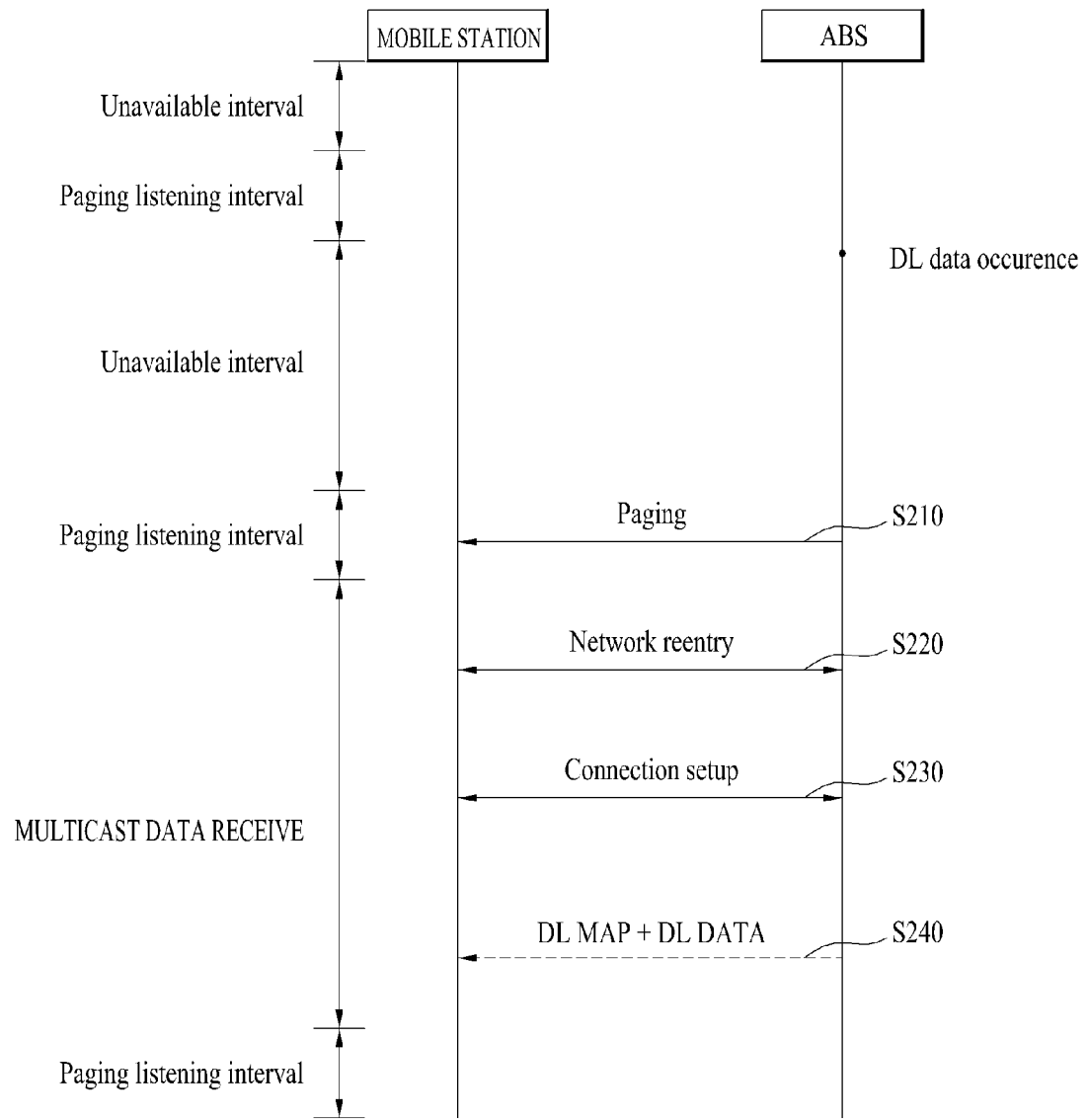
FIG. 2 is a flowchart showing an example of a paging method in an idle mode applicable in the present invention.

FIG. 2 is a flowchart showing an example of a paging method in an idle mode applicable in the present invention.

When downlink data are generated at a mobile station in an idle mode in a paging group to which a base station belongs, the base station may transmit a paging message to the mobile station in order to inform the mobile station about generation of the downlink data. The mobile station receives the paging message in a paging listening interval thereof to determine whether downlink (DL) data transmitted to the mobile station are present (S210).

Upon determining that the downlink data are present (i.e. positive indication), the mobile station performs a network reentry process including a ranging process (S220). Subsequently, the mobile station performs a Connection Setup for a related downlink service flow through a Dynamic Service Addition (DSA) process to the base station (S230).

After the Connection Setup for the service flow, the base station transmits downlink control information (e.g. MAP message) and downlink data for a corresponding service to the mobile station (S240).

Since most M2M devices are not mobile stations that users do not carry unlike general mobile stations, such as mobile phones, in an M2M scenario, an automatic application or firmware update process for the M2M devices may be an important application in an M2M service scenario.

For example, in order to update firmware of each device, an M2M server may transmit updated information to M2M devices having a corresponding application. In order to transmit multicast data necessary to be commonly transmitted to M2M devices in an idle mode, the base station pages the corresponding M2M devices through the paging process described with reference to FIG. 2.

The paged mobile station starts to transmit random access code to perform a network reentry process such that the mobile station accesses a network and receives DL traffic transmitted by the base station. These processes may increase unnecessary resource use of the network. In addition, the mobile stations may receive unnecessary data in a state in which M2M devices and general mobile stations coexist with the result that power consumption of the respective mobile stations may increase.

3. Identifiers Used in Embodiments of the Present Invention (1) M2M Group Identifier (MGID)

A M2M group zone is a logical zone including a plurality of ABSs. The M2M group zone is identified by an M2M group zone identifier (M2M GROUP ID). The M2M group zone identifier may be broadcast through an AAI-SCD message. An M2M group identifier (MGID) is an unique value of 12 bits or 15 bits for identifying a downlink multicast service flow shared by a group of M2M devices in the M2M group zone.

An M2M device implicitly derives a zone index corresponding to an M2M group zone identifier based on a sequence of the M2M group zone identifier in a broadcast message (e.g. AAI-SCD message). The zone index included first in the M2M group zone identifier is assigned to 0. In a case in which a maximum value of the M2M group zone supported by the base station is defined as 4, the zone index successively increase to MAX_M2M_GROUP_ZONE-1.

In a case in which an ABS is a portion of only one M2M group zone, the base station broadcasts only one M2M GROUP ZONE_ID and the M2M devices derive a corresponding M2M group zone index (0b00). The M2M device group is found using the MGID and the corresponding M2M group zone index. All MGIDs are assigned to M2M device belonging to the same M2M group zone. The MGIDs are assigned to multicast service flows of the M2M devices through a DSA process after initial network entry. In addition, the MGIDs are released in a case in which the M2M devices explicitly exit from the network or enters a DCR mode. The assigned MGIDs are maintained even in a case in which the M2M devices are in an idle mode. However, the assigned MGIDs are released in a case in which the M2M devices exit from the corresponding network or explicitly delete service flows associated with the MGIDs assigned at the network.

A plurality of MGIDs may be assigned to the M2M devices for different multicast service flows. The MGIDs may be reassigned in a connection state and in an idle mode state. In the connection state, the MGIDs may be changed or deleted through a DSC process and a DSD process. In the idle mode state, the MGIDs may be changed through location update (LU) or a network reentry process.

In a case in which the base station will change the MGIDs for all the M2M devices in the multicast group, the base station may trigger group location update through a paging message. In a case in which the base station needs to update an MGID of an M2M device when the M2M device performs location update based on a timer, the base station may transmit a ranging response (AAI-RNG-RSP) message including a new MGID in response to a ranging request (AAI-RNG-REQ) message during a location update process.

The base station may transmit a paging message (e.g. AAI-PAG-ADV) in order to indicate update of MGIDs and new values for all the M2M devices in the group. When M2M devices in an idle mode belonging to an M2M group identified by an MGID receive a paging message including the corresponding MGID and an action code set to 0b11, the M2M devices must update the MGID based on the indicated new MGID.

(2) Flow Identifier (FID)

To connection of each mobile station (ABS) is assigned a flow identifier (FID) of 4 bits for uniquely identifying such connection. The FID identifies Control Connection and Unicast Transport Connection. The FID for E-MBS connection is used to identify a specific E-MBS flow in an E-MBS zone together with an E-MBS ID of 12 bits, which is an unique identifier. The FID for multicast connection is used to uniquely identify a specific multicast flow in an ABS zone together with a Multicast Group ID of 12 bits. DL and UP transport FIDs are assigned from a transport FID space defined in Table 1 below.

TABLE 1

| Value | Description |
|---|---|
| 0000 | Control FID for unencrypted control connection payload in the MAC PDU(unicast control FID when PDU is allocated by unicast assignment A-MAP IE; broadcast control FID when PDU is allocated by broadcast assignment A-MAP IE) |
| 0001 | Unicast Control FID for encrypted control connection payload in the MAC PDU |
| 0010 | FID for Signaling header |
| 0011 | FID for transport connection associated with default service flow (UL and DL) |
| 0100-1111 | FID for transport connection |

An FID assigned for a specific DL transport connection is not assigned for another DL transport connection belonging to the same AMS. In addition, an FID assigned for a specific UL transport connection is not assigned for another UL transport connection belonging to the same AMS. An FID used for a DL transport connection may be assigned for another UL transport connection belonging to the same AMS and an FID used for an UL transport connection may be assigned for another DL transport connection belonging to the same AMS.

A specific FID may be pre-assigned. For example, FID values '0000' and '0001' indicated in Table 1 may be used for indicating a control FID. In addition, FID values '0010' and '0011' may be used for indicating an FID for a signaling header and an FID for a default service flow, respectively. Any connection at the ABS may be identified using a combination of the FID indicated in Table 1 and a Station Identifier (STID).

4. Multicast Operation for M2M Device (1) Outline of Multicast Operation

A multicast service that a base station (ABS) provides to M2M devices supports simultaneous transmission of DL data to M2M device belonging to a M2M device group using an MGID and an FID. The multicast service is associated with the ABS and is provided only on a DL. Each multicast connection is provided together with QoS and traffic parameters for a corresponding service flow. Service flows accompanied with multicast data are disclosed to individual M2M devices participating in a corresponding service in a connection state. At this time, the M2M devices acquire parameters for identifying a service flow associated with the service.

The same MGID is assigned to a group of M2M devices participating in the same multicast service during a DSA process. In order to access the multicast service, M2M devices, to which the MGID has been assigned, may apply a CRC mask of 16 bits including a masking prefix set to 0b0, a message type indicator set to 0b010, and an MGID of 12 bits to decode an M2M Group Assignment A-MAP IE. The M2M devices acquire resource assignment information for a multicast burst through M2M multicast assignment A-MAP IE (M2M MA A-MAP IE). At this time, a FID field of an MAC header of an MAC PDU (included in the multicast burst) accompanied with an MAC SDU for a multicast service flow is set to '0100'. The MAC PDU is a transport unit used in an MAC layer. In a case in which the MAC PDU is transmitted in a physical (PHY) layer, the MAC PDU is transmitted in the form of a multicast burst.

The base station forms multicast connection together with the respective M2M devices to set a DL multicast service associated with a corresponding service. In embodiments of the present invention, any FIDs may be used for a multicast service. That is, a dedicated FID for multicast transport connection may not be set. The multicast connection is set using a combination of an MGID and a FID assigned through a DSA process. Since the multicast connection is associated with a service flow, the multicast connection is associated with QoS and traffic parameters for a service flow. An Automatic Retransmission reQuest (ARQ) is not applied to the multicast connection but a general encryption key for guaranteeing integrity protection and encryption for corresponding multicast traffic is used.

(2) M2M Multicast Operation in Idle Mode

The M2M base station may provide a multicast service in a state in which the M2M base station request an M2M mobile station in an idle mode to reenter the network or in a state in which the M2M base station does not request the M2M mobile station to reenter the network. Before transmission of downlink (DL) multicast data, the base station may transmit a paging message (e.g. AAI-PAG-ADV) including multicast related information (e.g. traffic indication and MTST) to the M2M mobile station in a paging listening interval. If the M2M device receives a paging message indicating to receive multicast traffic without network reentry and the paging message does not include information about a Multicast Transmission Start Time (MTST), the M2M device starts to receive DL multicast data without ending the idle mode.

The multicast transmission start time (MTST) included in the paging message indicates a time when DL multicast data, which will be transmitted by the base station, is transmitted. A value of the multicast transmission start time must be less than a start time of the next paging listening interval of the M2M device having received the paging message. The M2M device may be powered off up to a frame indicated by the multicast transmission start time included in the paging message. Upon completion of the multicast data transmission, the base station transmits an AAI-MTE-IND message or a Multicast Transmission End Extended Header (MTEEH) to the M2M device in order to inform the M2M device about completion of the multicast data transmission. The M2M device may reenter a paging unavailable interval immediately on receiving the AAI-MTE-IND message.

(3) Paging Message

Table 2 below shows an example of a paging message used in embodiments of the present invention.

TABLE 2

| Field | Size | Description | Condition |
|---|---|---|---|
| ... | ... | ... | ... |
| For (i=0; i<Num_MGID; i++) { |  | Indicates the number of MGIDs included in a corresponding paging message | Included in a case in which a base station transmits DL multicast data for an M2M device after transmission of an AAI-PAG-ADV message |
| MGID | 12/15 | M2M group identifier |  |
| Action Code | 1 | 0: Network reentry<br>1: Reception of multicast traffic |  |
| If(Action Code ==1){ |  |  |  |
| Multicast transmission start time (MTST) } | TBD | Indicates a frame number at which ABS starts to transmit DL multicast data | Included in a case in which an MTST field needs to be included in a corresponding message |
| ... | ... | ... | ... |
| } |  |  |  |

Referring to Table 2, a paging message (AAI-PAG-ADV) may include an M2M group identifier (MGID) field for identifying an M2M group, an action code field indicating whether information necessary for network reentry or reception of multicast traffic is included, and a multicast transmission start time (MTST) field indicating a frame number at which the base station (ABS) starts to transmit DL multicast data.

5. A Method of Transmitting Reliable Control Information to M2M Devices

Hereinafter, a description will be given of methods of reliably transmitting and receiving data and an MAC control message to and from M2M devices.

Figure 3:
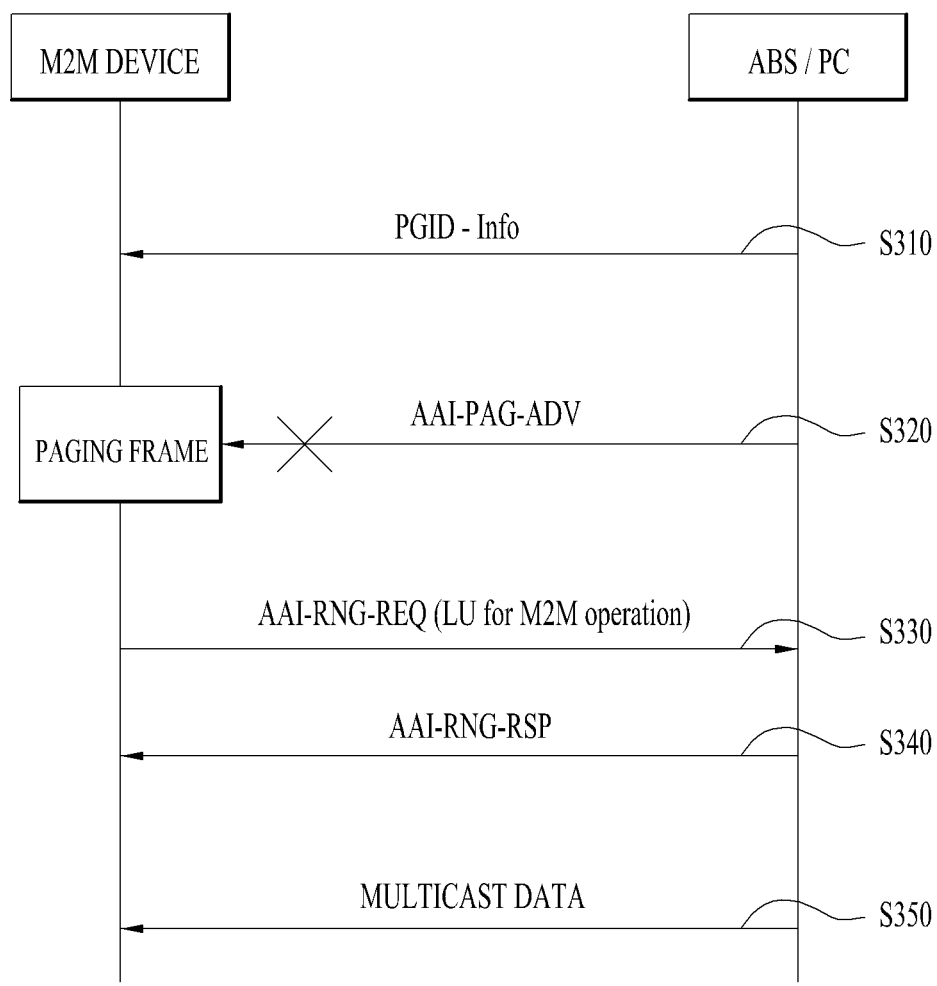
FIG. 3 is a view showing an example of a method of reliably transmitting control information to an M2M device according to an embodiment of the present invention.

FIG. 3 is a view showing an example of a method of reliably transmitting control information to an M2M device according to an embodiment of the present invention.

A method of solving a problem in that an M2M device in an idle mode does not receive a paging message (e.g. AAI-PAG-ADV) including multicast control information associated with multicast traffic and thus does not receive multicast data will be described with reference to FIG. 3. The multicast control information associated with multicast traffic may include an MGID for identifying an M2M group to which the M2M device belongs, an MTST field indicating a time when multicast traffic is transmitted, and an action code indicating that the multicast traffic is transmitted (see Table 2).

Referring to FIG. 3, a base station 150 or a paging controller (PC) transmits a paging group identifier information (PGID-info) message including a Multicast Traffic Indicator (MTI) field indicating that a paging message associated with multicast traffic will be transmitted to M2M devices in an idle mode before transmitting the paging message to an M2M device 100 (S310).

At this time, at step S310, in a case in which an error occurs in a paging message to be transmitted, the multicast traffic indicator field may also indicate whether error control will be performed.

The M2M device, having received the PGID-info message, waits for a paging message (see Table 2) to be received in a paging listening interval or a paging frame thereof. In a case in which the paging message is not transmitted from the base station according to a channel environment or the received paging message has an error, however, the M2M device may not normally receive the paging message (S320).

The M2M device, not having received the paging message in the paging listening interval or the paging frame, may perform a location update process to inform the base station that the paging message has not been normally received. Accordingly, the M2M device transmits a ranging request (AAI-RNG-REQ) message including a Ranging Purpose Indication field indicating location update for M2M multicast operation to the base station (S330).

Upon receiving the AAI-RNG-REQ message for location update associated with the M2M multicast operation from the M2M device, the base station transmits a ranging response (AAI-RNG-RSP) message including information about whether the paging message including the multicast information has been transmitted and control information (e.g. MTST, resource assignment information, etc) associated with transmission of multicast data to the M2M mobile station (S340).

The M2M device may receive multicast data to be subsequently transmitted using the control information associated with the multicast data received through the AAI-RNG-RSP message (S350).

The PGID-info message was described as an example of the message or signal transmitted at step S310. Alternatively, a broadcast/multicast message or signal (e.g. SFH SPs or SCD) may be used instead of the PGID-info message.

In addition, at step S310, a Multicast Traffic Indication (MTI) bitmap field may be used instead of the MTI field included in the PGID-info message. At this time, each bit of the MTI bitmap indicates each frame in a superframe. In this case, the size of the MTI bitmap may be 4 bits. Each bit of the MTI bitmap indicates whether a paging message is transmitted in a frame corresponding to each bit. In a case in which the paging message is transmitted in a corresponding frame, a corresponding bit is set to '1'. Consequently, the M2M device attempts to receive a paging message only in a frame indicated by the MTI bitmap and remains in an idle mode state in the remaining frames even when the remaining frames correspond to a paging listening interval.

Table 3 below shows an example of a paging group identifier information message format which may be used at step S310.

TABLE 3

| Field | Size | Description | Condition |
|---|---|---|---|
| ... | ... | ... | ... |
| } // End If (an ABS supports multiple carrier operation) | | | |
| Multicast Traffic Indication | 1 | Indicates whether at least one paging message (e.g. AAI-PAG-ADV) including an action code indicating whether multicast data are transmitted and an MGID in a corresponding superframe is transmitted.<br>0: No paging message;<br>1: Paging message transmitted | |
| ... | | | |

In a case in which a PGID-info message indicated in Table 3 is used at step S310 and an MTI field of the PGID-info message is set to 1, the M2M device assumes that the paging message is transmitted in a current superframe and decodes the paging message in the paging listening interval thereof (see S320). At this time, the M2M device may decide a paging frame through modulo operation (e.g. DID modulo M, (M=1, 2, 3, or 4)) as defined in an IEEE 802.16m system.

In a case in which the M2M device does not normally receive the paging message in the paging listening interval thereof, the M2M device may report the same to the base station during a ranging profess for location update (see S330 and S340).

For example, the M2M device transmits a request for confirming whether the base station has transmitted multicast traffic and a paging message including multicast related control information (e.g. MGID, MTST, etc.) to the base station through a ranging request message (AAI-RNG-REQ) and the base station transmits a ranging response message including a confirmation result thereof.

Table 4 below shows another example of a paging group identifier information (PGID-info) message format which may be used at step S310.

Referring to Table 4, it can be seen that an MGID is further included as compared with the PGID-info message indicated in Table 3. That is, as the M2M group ID (MGID) is included in the PGID-info message in Table 4, only the M2M devices to which the MGID included in the PGID-info message has been assigned receive a paging message in a case in which the paging message is not normally transmitted with the result that unnecessary message transmission overhead may be reduced.

In other words, if the MIT field is set to 1 in a case in which the PGID-info message indicated in Table 3 is used, when all the M2M devices have not received the paging message, it is necessary to perform a location update process for confirming the same. In case of Table 4, on the other hand, only the M2M devices corresponding to the MGID included in the PGID-info message perform the location update process with the result that the network and the M2M devices may reduce unnecessary message transmission overhead.

Table 5 below shows a further example of a paging group identifier information (PGID-info) message format which may be used at step S310.

TABLE 4

| Field | Size (Bit) | Description | Condition |
|---|---|---|---|
| | | ... | |
| } // End If (an ABS supports multiple carrier operation) | | | |
| Multicast traffic indication | 1 | Indicates whether at least one paging message (e.g. AAI-PAG-ADV) including an action code indicating whether multicast data are transmitted and an MGID in a corresponding superframe is transmitted.<br>0: No paging message;<br>1: Paging message transmitted | |
| If (Multicast traffic indication ==1) {<br>For (i=0; i< Num_MGID; I ++) {<br>MGID | TBD | MGIDs included in a paging message transmitted in a corresponding superframe | |
| } | | | |

TABLE 5

| Field | Size | Description | Condition |
|---|---|---|---|
| } // End If (an ABS supports multiple carrier operation) | | | |
| Multicast Traffic Indication Bitmap | 4 | Indicates whether at least one paging message (e.g. AAI-PAG-ADV) including an action code indicating whether multicast data are transmitted and an MGID in each frame of a corresponding superframe is transmitted.<br>Bit #0: First frame<br>Bit #1: Second frame<br>Bit #2: Third frame<br>Bit #3: Fourth frame.<br>Indicates whether a paging message is transmitted in a frame corresponding to a bit of a bitmap set to '1' | This field is included in a case in which one or more of the paging messages transmitted in the corresponding superframe are transmitted. |

In Table 5, a MTI bitmap is included unlike Table 3. That is, each bit of the MTI bitmap indicates in which frame of a superframe, in which a PGID-info message has been transmitted, a paging message is transmitted. That is, the M2M device confirms the MTI bitmap to confirm in which paging frame the paging message is transmitted in a paging listening interval thereof and, in a case in which the M2M device does not receive the paging message in the paging listening interval thereof or the paging message is not transmitted, performs location update described with reference to FIG. 3 to acquire information related to transmission of multicast data. In addition, the M2M device may decide a paging frame through modulo operation (e.g. DID modulo m, (m=1, 2, 3, or 4)) as defined in an IEEE 802.16m system. A value of 'm' may be included in the PGID-info message.

Table 6 below shows an example of a ranging request message format which is used at step S330.

Referring to Table 6, a ranging request message may include one or more selected from among a ranging purpose indication field, an AMS mobility information field, an action code field for confirming whether a paging message has been transmitted, and an M2M group identifier. In a case in which an M2M device in an idle mode receives a PGID-info message, an MTI field of which is set to 1, at step S310 and does not receive a paging message in a paging listening interval of the M2M device, the M2M device may transmit a AAI-RNG-REQ message of Table 6 to the base station in order to confirm whether the base station has transmitted a paging message to be transmitted to the M2M device at step S330. At this time, the ranging purpose indication field of the AAI-RNG-REQ message is set to a bit indicating M2M multicast operation (i.e. 0b1110) and the M2M action code is set to 1. At this time, the M2M device may transmit an M2M group ID, to which

TABLE 6

| Field | Size | Description | Condition |
|---|---|---|---|
| ... | | | |
| Ranging Purpose Indication | | 0b0000 = Initial network entry<br>0b0001 = HO reentry<br>0b0010 = Network reentry in an idle mode<br>...<br>0b1101 = NS/EP call establishment<br>0b1110 = M2M multicast operation<br>0b1111 = reserved | |
| ...<br>} else if (Ranging Purpose Indication== 0b0011\|0b0110\|0b0111\|0b1011\|0b1110) {<br>... | | | |
| AMS mobility Information | 2 | | |
| M2M Action Code | 1 | 1: Location update is requested in a case in which a paging message including an action code indicating multicast transmission is transmitted | Included in a case in which a paging purpose indication field is set to 0b1110 |
| If(M2M Action Code = 0b1){<br>M2M group ID | | 15 or 16 | M2M group identifier assigned to M2M device |
| }<br>SMS<br>} else if (Ranging Purpose Indication ==0b0100){ | | | |
| ... | ... ... | ... | | the M2M device belongs, to the base station in a state of being included in the AAI-RNG-REQ message.

The base station, having received the AAI-RNG-REQ message indicated in Table 6, may transmit a ranging response (AAI-RNG-RSP) message to the M2M device in response thereto. Table 7 below shows an example of a ranging response message format which is used at step S340.

TABLE 7

| Field | Size | Description | Condition |
|---|---|---|---|
| ... | ... | ... | ... |
| If(Location Update Response == 0x0){ | | | |
| ... | ... | ... | ... |
| New Multicast Group ID | | | |
| New ID | | | |
| } | | | |
| M2M response code | 1 | 0: ABS does not transmit a paging message for multicast traffic transmission<br>1: ABS transmits a paging message for multicast traffic transmission | Included in a case in which a ranging purpose indication field of an AAI-RNG-REQ message is set to 0b1110 |
| If(M2M response code=0b1){ | | | |
| Multicast Transmission Start Time | | Indicates time when multicast traffic starts to be transmitted. Indicates one or more selected from among a superframe number, a frame number, and a subframe number | |
| } | | | |
| SMS | | | |
| }//end of if(Location Update Response == 0x0){ | | | |
| ... | ... | ... | ... |

Referring to Table 7, a ranging response message which may be used at step S340 may include one or more selected from among a New Multicast Group ID field, a New FID field, an M2M Response Code field, and a Multicast Transmission Start Time field.

In a case in which the base station has transmitted a paging message associated with multicast traffic for an M2M group to which the M2M device belongs, the base station transmits a ranging response message, an M2M response code of which is set to '1', of Table 7 to the M2M device. That is, when the M2M device receives an AAI-RNG-RSP message, an M2M response code of which is set to '1', the M2M device in an idle mode may receive multicast data from a superframe, frame, or subframe indicated by an MTST field (see S340). If the M2M device receives a ranging response message, an M2M response code of which is set to '0', the M2M device immediately returns to an idle mode.

Figure 4:
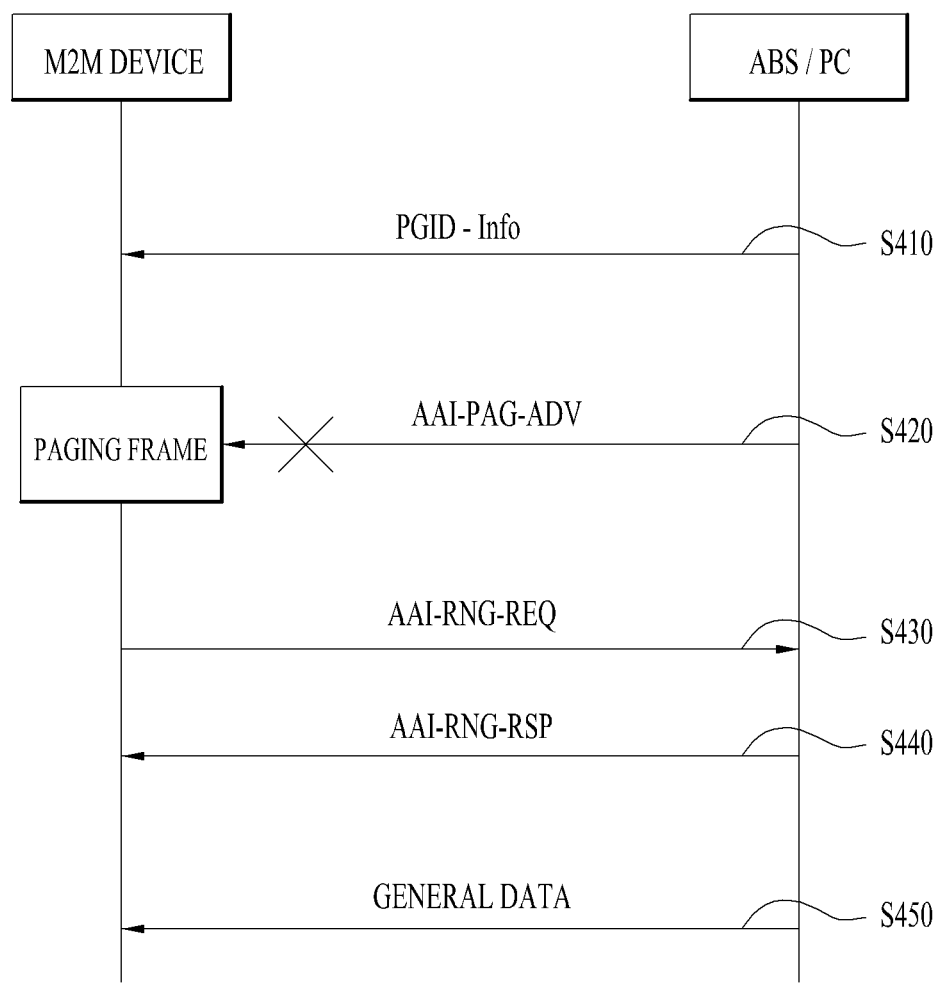
FIG. 4 is a view showing another example of a method of reliably transmitting control information to an M2M device according to an embodiment of the present invention.

FIG. 4 is a view showing another example of a method of reliably transmitting control information to an M2M device according to an embodiment of the present invention.

A method of solving a problem in that a paging message (e.g. AAI-PAG-ADV) associated with unicast traffic as well as multicast traffic for an M2M device in an idle mode is not received and thus reliable data transmission is not performed will be described with reference to FIG. 4.

Referring to FIG. 4, a base station 150 transmits a paging group identifier information (PGID-info) message including a Reliable Traffic Indicator (RTI) field indicating that a paging message associated with general data traffic will be transmitted to M2M devices in an idle mode before transmitting the paging message to an M2M device 100 (S410).

At this time, at step S410, in a case in which an error occurs in a paging message to be transmitted, the RTI field may also indicate whether error control will be performed.

Table 8 below shows an example of a PGID-info message format which may be used at step S410.

TABLE 8

| Field | Size | Description | Condition |
|---|---|---|---|
| ... | ... | ... | ... |
| } // End If (an ABS supports multiple carrier operation) | | | |
| Reliable traffic Indication | 1 | Indicates whether at least one paging message (e.g. AAI-PAG-ADV) including information requiring reliability (e.g. an action code indicating whether unicast data are transmitted and an MGID) in one or more frames of a corresponding superframe is transmitted.<br>0: No paging message;<br>1: Paging message transmitted | A case in which one or more of the paging messages transmitted in the corresponding superframe are transmitted. |

Table 9 below shows another example of a PGID-info message format which may be used at step S410.

TABLE 9

| Field | Size | Description | Condition |
|---|---|---|---|
| } // End If (an ABS supports multiple carrier operation) | | | |
| Reliable traffic Indication Bitmap | 4 | Indicates whether at least one paging message (e.g. AAI-PAG-ADV) including an action code indicating whether unicast data are transmitted and an MGID in each frame of a corresponding superframe is transmitted. Bit #0: First frame Bit #1: Second frame Bit #2: Third frame Bit #3: Fourth frame. Indicates whether a paging message is transmitted in a frame corresponding to a bit of a bitmap set to '1' | Included in a case in which one or more of the paging messages transmitted in the corresponding superframe are transmitted. |

In Table 9, an RTI bitmap is included unlike Table 8. That is, each bit of the RTI bitmap indicates in which frame of a superframe, in which a PGID-info message has been transmitted, a paging message is transmitted. That is, the M2M device confirms the RTI bitmap to confirm in which paging frame the paging message is transmitted in a paging listening interval thereof and, in a case in which the M2M device does not receive the paging message in the paging listening interval thereof or the paging message is not transmitted, performs location update described with reference to FIG. 4 to acquire information related to transmission of multicast data. At this time, the M2M device may decide a paging frame through modulo operation (e.g. DID modulo m, (m=1, 2, 3, or 4)) as defined in an IEEE 802.16m system. A value of 'm' may be included in the PGID-info message.

The M2M device, having received the PGID-info message as indicated in Table 8 or Table 9, waits for a paging message (see Table 2) to be received in a paging listening interval or a paging frame thereof. In a case in which the paging message is not transmitted from the base station according to a channel environment or the received paging message has an error, however, the M2M device may not normally receive the paging message (S420).

The M2M device, not having received the paging message in the paging listening interval or the paging frame, may perform a location update process to inform the base station that the paging message has not been normally received. Accordingly, the M2M device transmits a ranging request (AAI-RNG-REQ) message including a Ranging Purpose Indication field indicating location update for M2M multicast operation to the base station (S430).

Upon receiving the AAI-RNG-REQ message for location update associated with the M2M unicast operation from the M2M device, the base station transmits a ranging response (AAI-RNG-RSP) message including information about whether the paging message including the unicast information has been transmitted and control information (e.g. data transmission time information, resource assignment information, etc) associated with transmission of unicast data to the M2M mobile station (S440).

The M2M device may receive unicast data to be subsequently transmitted using the control information associated with the unicast data received through the AAI-RNG-RSP message (S450).

The PGID-info message was described as an example of the message or signal transmitted at step S410. Alternatively, a broadcast/multicast message or signal (e.g. SFH SPs or SCD) may be used instead of the PGID-info message.

In addition, at step S410, a Reliable Traffic Indication (RTI) bitmap field may be used instead of the RTI field included in the PGID-info message. At this time, each bit of the RTI bitmap indicates each frame in a superframe. In this case, the size of the RTI bitmap may be 4 bits. Each bit of the RTI bitmap indicates whether a paging message is transmitted in a frame corresponding to each bit. In a case in which the paging message is transmitted in a corresponding frame, a corresponding bit is set to '1'.

Table 10 below shows another example of a ranging response message format which is used at step S340 or step S440.

TABLE 10

| Field | Size | Description | Condition |
|---|---|---|---|
| ... If(Location Update Response ==0x0){ | ... | ... | ... |
| ... New Multicast Group ID New FID } | ... | ... | ... |
| M2M response Code | 1 | 0: A paging message associated with multi/unicast traffic for an M2M device is not transmitted 1: A paging message associated with multi/unicast traffic for an M2M device is transmitted | A case in which a ranging purpose indication field included in an AAI-RNG-REQ message is set to 0b1110 |

TABLE 10-continued

| Field | Size | Description | Condition |
|---|---|---|---|
| If(M2M response code = 0b1){ | | | |
| Data Transmission Time | | Indicates a superframe, frame, or subframe number at which multi/unicast traffic is transmitted | |
| M2M Group ID | 15 | | |
| Burst Size | 6 | Burst size of multi/unicast traffic | |
| Resource Index | 11 | 512 FFT size: 0 in first 2 MSB bits + 9 bits for resource index<br>1024 FFT size: 11 bits for resource index<br>2048 FFT size: 11 bits for resource index.<br>Resource index includes location and allocation size. | |
| Long TTI Indicator | 1 | Indicates the number of AAI subframes in which assigned resources are maintained.<br>0b0: 1 AAI subframe (default TTI)<br>0b1: 4 DL AAI subframe for FDD or all DL AAI subframes for TDD (long TTI) | |
| }<br>SMS<br>}//end of if(Location Update Response == 0x0) | | | |
| ... | ... ... | | ... |

Referring to Table 10, a ranging response message which may be used at step S340 or step S440 may include one or more selected from among a New Multicast Group ID field, a New FID field, an M2M Response Code field, and a Data Transmission Time field. In addition, the ranging response message of Table 10 may further include resource assignment information indicating a resource zone in which multicast data or unicast data are transmitted. At this time, the resource assignment information may include a burst size field, a resource index field, and a long TTI indicator field. The ranging response message of Table 10 may be used for unicast transmission of general data as well as multicast traffic.

In another aspect of the embodiment of the present invention, in a case in which successive multicast traffic is present after execution of step S350 of FIG. 3, resource information about successive multicast traffic to be subsequently transmitted may be included in an MAC PDU of the multicast data at step S350. In addition, in a case in which successive unicast traffic is present after execution of step S450 of FIG. 4, resource information about successive multicast traffic to be subsequently transmitted may be included in an MAC PDU of the multicast data at step S450.

At this time, the resource assignment information included in the MAC PDU of the multicast data or the unicast data at step S350 or step S450 may have a form of a MAC control message or a form of an extended header. Table 11 below shows an example of a Next Resource Assignment (AAI-NRS-ASM) message as a MAC control message including resource assignment information for successive multicast data or unicast data.

TABLE 11

| Field | Size | Description |
|---|---|---|
| Transmission Time | | Information about a time (superframe/frame/subframe) when next data are transmitted |
| M2M Group ID | 15 | |
| Burst Size | 6 | Burst Size |

TABLE 11-continued

| Field | Size | Description |
|---|---|---|
| Resource Index | 11 | 512 FFT size: 0 in first 2 MSB bits + 9 bits for resource index<br>1024 FFT size: 11 bits for resource index<br>2048 FFT size: 11 bits for resource index.<br>A resource index field includes information about location and assignment size. |
| Long TTI Indicator | 1 | Indicates the number of AAI subframes occupied by assigned resources.<br>0b0: 1 AAI subframe (default TTI)<br>0b1: 4 DL AAI subframe for FDD or all DL AAI subframes for TDD (long TTI) |

Table 12 below shows an example of a Next Resource Assignment Extended Header (NRAEH) as an extended header.

TABLE 12

| Syntax | Size | Description |
|---|---|---|
| NRAEH( ){ | | |
| Type | 4 | Extended header type = 0b1100 |
| Transmission Time | | A time when data are transmitted (on a per superframe/frame/subframe basis) |
| M2M Group ID | 15 | |
| Burst Size | 6 | Burst Size |
| Resource Index | 11 | 512 FFT size: 0 in first 2 MSB bits + 9 bits for resource index<br>1024 FFT size: 11 bits for resource index<br>2048 FFT size: 11 bits for resource index.<br>A resource index field includes information about location and assignment size. |
| Long TTI Indicator | 1 | Indicates the number of AAI subframes occupied by assigned resources.<br>0b0: 1 AAI subframe (default TTI)<br>0b1: 4 DL AAI subframe for FDD or all DL AAI subframes for TDD (long TTI) |
| } | | |

In a case in which the AAI-NRS-ASM message of Table 11 or the NRAEH of Table 12 is transmitted to the M2M device in a state of being piggyback with the multicast data, the M2M device transmits an AAI-MSG-ACK message to the base station as a reception confirmation response to the AAI-NRS-ASM or the NRAEH. The base station transmits an CDMA assignment A-MAP IE to the M2M device to assign a resource for the AAI-MSG-ACK message and an MCRC is masked using an RAID used in the CDMA assignment A-MAP IE of the AAI-RNG-REQ message. In a case in which the M2M device receives the AAI-NRS-ASM message or the NRAEH piggyback with the data, the M2M device starts an ACK timer and waits for the CDMA assignment A-MAP IE for the AAI-MSG-ACK message.

Figure 5:
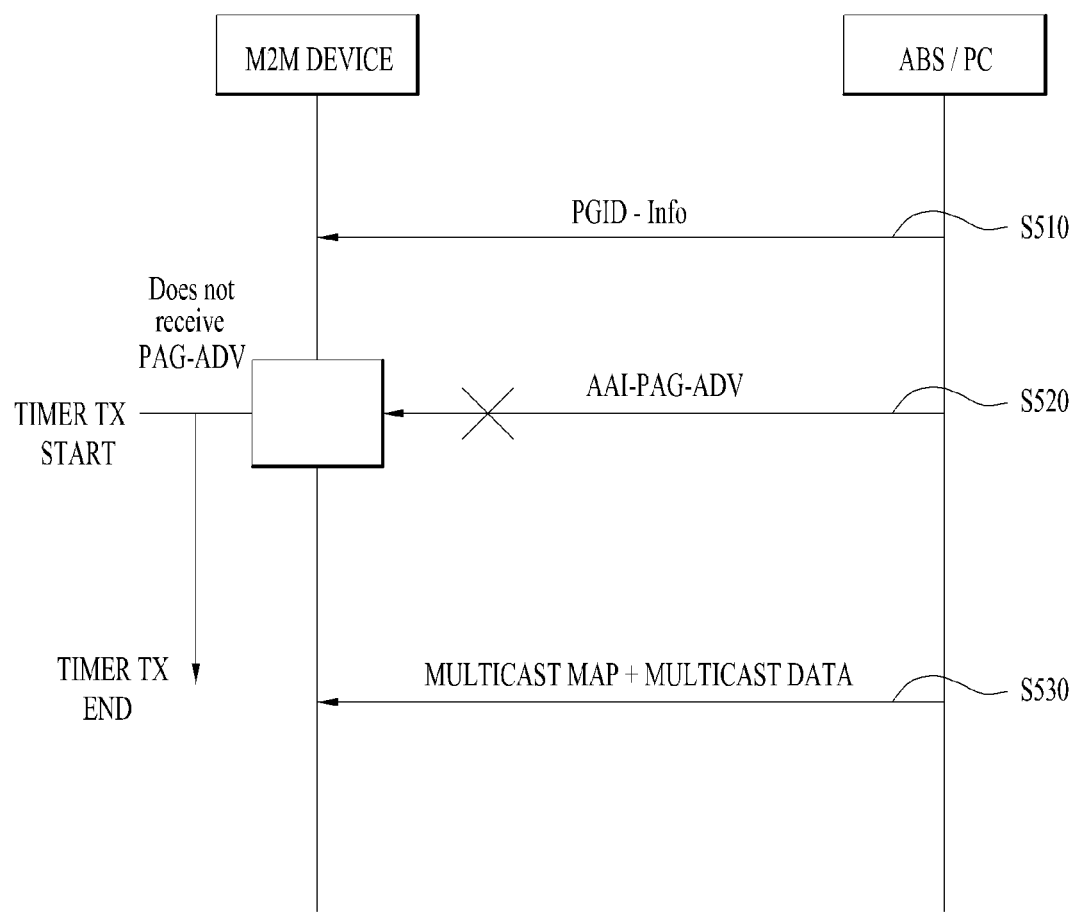
FIG. 5 is a view showing another example of a method of reliably transmitting control information to an M2M device according to an embodiment of the present invention.

FIG. 5 is a view showing another example of a method of reliably transmitting control information to an M2M device according to an embodiment of the present invention.

In FIGS. 3 and 4, in a case in which the multicast traffic indication (MTI) field or the reliable traffic indication (RTI) field included in the PGID-Info message is set to '1', if the M2M device does not receive a paging message in the paging listening interval thereof, the M2M device informs the base station of the same through a location update process. Hereinafter, a description will be given of a method of the M2M device confirming whether multicast data transmitted to the M2M device for a predetermined time are present using a timer without execution of a location update process.

Referring to FIG. 5, the base station transmits a PGID-Info message as described in Table 3, 4, 5, 8, or 9 to the M2M device (S510).

The M2M device waits for a paging message (e.g. AAI-PAG-ADV) to be received in a paging listening interval thereof. In a case in which the paging message is lost on a channel or has an error such that the paging message cannot be normally decoded, however, the M2M device starts a timer Tx for a predetermined time from a time when the paging listening interval ends without execution of a ranging process for location update (S520).

In addition, at step S520, the M2M device continues to monitor a wireless channel without reentering an idle mode during operation of the timer. Upon receiving a multicast MAP message including resource assignment information indicating a resource zone in which an MGID for the M2M device and multicast traffic are transmitted during operation of the timer, the M2M device stops the timer and receives multicast data in the resource zone indicated by the resource assignment information (S530).

Figure 6:
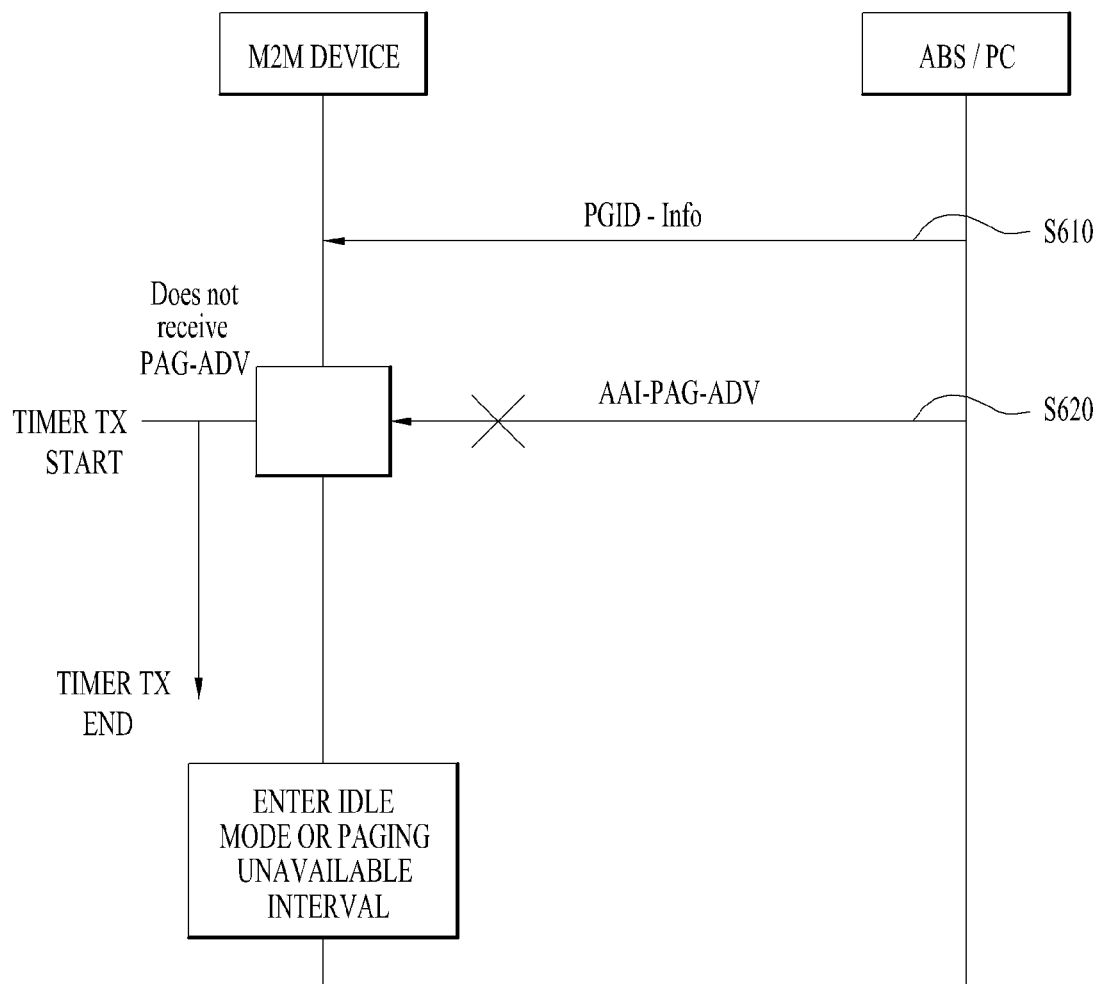
FIG. 6 is a view showing another example of a method of reliably transmitting control information to an M2M device according to an embodiment of the present invention.

FIG. 6 is a view showing another example of a method of reliably transmitting control information to an M2M device according to an embodiment of the present invention.

FIG. 6 is basically identical to FIG. 5. Accordingly, a description of step S610 and step S620 is replaced with that of step S510 and step S520.

At step S620, the M2M device continues to monitor a wireless channel without reentering an idle mode during operation of the timer. Upon not receiving a multicast MAP message including resource assignment information indicating a resource zone in which an MGID for the M2M device and multicast traffic are transmitted during operation of the timer, the M2M device stops the timer and directly enters an idle mode or enters a paging unavailable interval (S630).

In FIGS. 5 and 6, in a case in which the M2M device receives the PGID-Info message but does not receive a paging message, the M2M device may monitor whether multicast data are transmitted up to the next paging listening interval instead of the timer in order to confirm whether multicast data transmitted to the M2M device are present.

In FIGS. 5 and 6, information about a timer time may be further included in the PGID-Info message at step S510 and step S610. The M2M device may be set such that the M2M device operates the timer only in a case in which the MTI field or the RTI field is set to '1'.

Figure 7:
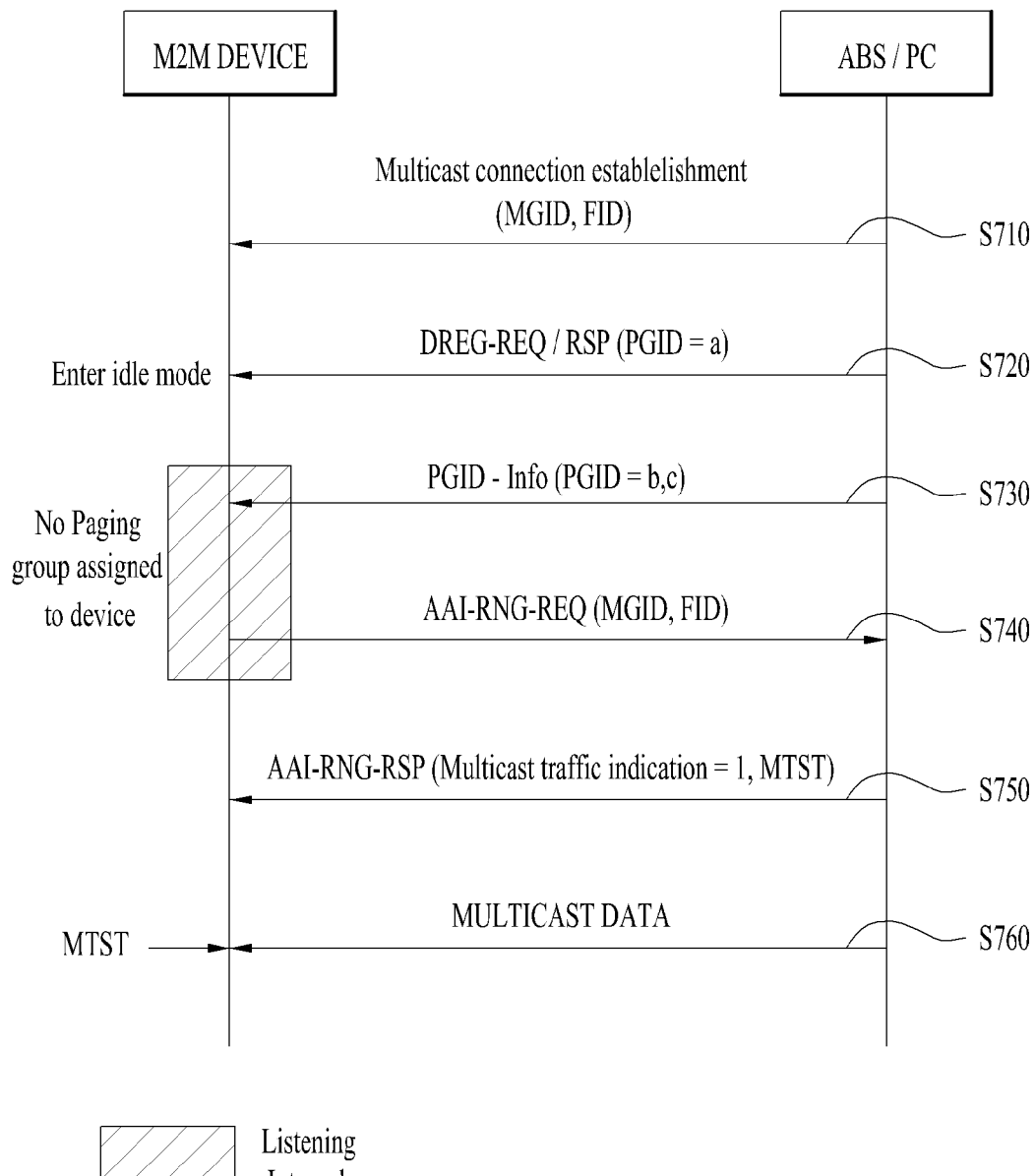
FIG. 7 is a view showing a further example of a method of reliably transmitting control information to an M2M device according to an embodiment of the present invention.

FIG. 7 is a view showing a further example of a method of reliably transmitting control information to an M2M device according to an embodiment of the present invention.

An M2M device 100 monitors paging messages transmitted by a preferred base station (ABS) 150 during a paging listening interval. At this time, if the M2M device does not find a paging group assigned thereto, the M2M device performs location update. If the M2M device does not find a paging group to which the M2M device belongs, the M2M device performs location update. That is, in a case in which a paging group to which the M2M device belongs is changed, the M2M device cannot receive a PGID-Info message or a paging message (e.g. AAI-PAG-ADV). In this case, the M2M device cannot receive multicast related information included in the paging message and thus cannot receive multicast data. Accordingly, a method of solving a problem in that the M2M device does not receive multicast data transmitted thereto as a paging group is changed will be described with reference to FIG. 7.

Referring to FIG. 7, the M2M device 100 and the base station (ABS) 150 perform a multicast connection establishment process. Through the multicast connection establishment process, a multicast group may be assigned to the M2M device and a multicast group identifier for identifying the multicast group may be assigned to the M2M device. In addition, a flow identifier (FID) for identifying an established flow may be assigned to the M2M device from the base station (S710).

The multicast connection establishment process of step S710 may be performed through an initial network entry process, a registration process, and a basic performance negotiation process.

Subsequently, the M2M device may transmit a deregistration request (AAI-DREG-REQ) message to the base station in order to enter an idle mode and may receive a deregistration response (AAI-DREG-RSP) message in response thereto. At this time, the deregistration response message includes a paging group identifier (PGID=a) for identifying a paging group assigned to the M2M device. Upon receiving the deregistration response message, the M2M device enters an idle mode (S720).

The base station transmits a PGID-Info message including a paging identifier (PGID=b, c) to the M2M device. In addition, the M2M device monitors a wireless channel to confirm whether a message transmitted thereto is present in the paging listening interval (S730).

However, the paging identifier assigned to the M2M device is a and the paging identifier included in the PGID-Info message transmitted at step S730 is b, c. For this reason, the M2M device cannot receive the PGID-Info message. Consequently, the M2M device performs location update to receive multicast related messages transmitted thereto.

During the location update process, the M2M device transmits a ranging request message (AAI-RNG-REQ) including a paging group identifier for identifying a paging group to which the M2M device belongs and an FID for identifying a multicast service flow to the base station (S740).

Table 13 below shows an example of a ranging request message which is used at step S740.

TABLE 13

| Field | Size | Description | Condition |
|---|---|---|---|
| ... | ... | ... | ... |
| Ranging Purpose Indication | 4 | 0b0000 = Initial network entry<br>0b0001 = HO reentry<br>0b0010 = Network reentry in an idle mode<br>...<br>0b1101 = NS/EP call establishment<br>0b1110 = M2M multicast operation<br>0b1111 = reserved | ... |
| ... | ... | ... | ... |
| } else if (Ranging Purpose Indication == 0b0011\|0b0110\|0b0111\|0b1011\|0b1110) { | | | |
| ... | ... | ... | ... |
| AMS Mobility Information | 2 | | |
| MGID and FID inclusion | 1 | 0b1: Indicates that MGID and FID are included in location update information | |
| If(MGID and FID inclusion = 0b1){<br>For(i=0; i<NUM_MGIDs;i++){ | | NUM_MGIDs indicates the total number of MGIDs assigned to mobile station | |
| M2M group ID | 15 or 16 | M2M group identifier assigned to M2M device | |
| For (i=0; i<NUM_FIDs; i++){ | | Indicates the total number of FIDs associated with MGID | |
| FID | 4 | FID associated with MGID | |
| }<br>}<br>}<br>SMS<br>} else if (Ranging Purpose Indication == 0b0100){ | | | |
| ... | ... | ... | ... |

Referring to FIG. 13, a ranging request message may include one or more selected from among a ranging purpose indication field indicating that a corresponding location update process is provided for M2M multicast operation, an MGID and FID inclusion field indicating whether an MGID and an FID are included in a corresponding message, an M2M group identifier (MGID) assigned to the M2M device, and an FID associated with the MGID.

In a case in which the base station receives an AAI-RNG-REQ message and the AAI-RNG-REQ includes an MGID (a) and an FID for the M2M device, the base station confirms whether the base station has multicast data for corresponding multicast connection. In a case in which the base station has multicast data for the M2M device, the base station transmits a ranging response (AAI-RNG-RSP) message including scheduling information (e.g. MGID and information about a transmission start time when multicast data are transmitted (MTST)) about multicast data (S750).

Table 14 below shows an example of a ranging response message which is used at step S750.

TABLE 14

| Field | Size | Description | Condition |
|---|---|---|---|
| ... | ... | ... | ... |
| If(Location Update Response == 0x0){ | | | |
| ... | ... | ... | ... |
| }//end of for (N-E-MBS-Zone-IDs) | | | |
| For(i=0; i<M; i++){ | | The number of MGIDs and FIDs. A mapping relationship between current MGID and FID and new MGID and FID to be updated | Included if update is needed |
| Current Multicast Group ID | 12 | | |
| Current FID | 4 | | |
| New Multicast Group ID | 12 | | |
| New FID | 4 | | |
| } | | | |
| Multicast Traffic Indication | 1 | 0: Multicast data for M2M device are absent<br>1: Multicast data for M2M device are present | Included in a case in which multicast data corresponding to MGID and FID included in a ranging request message are present |

TABLE 14-continued

| Field | Size | Description | Condition |
|---|---|---|---|
| If(Multicast Traffic Indication =0b1){ | | | |
| MGID | 15 | Identifier for an M2M group | |
| Multicast Transmission Start Time (MTST) | TBD | Indicates time when DL multicast data are transmitted | |
| } | | | |
| SMS | | | |
| }//end of If(Location Update Response ==0x0) | | | |
| ... | ... ... | | ... |

Referring to Table 14, a ranging response message may include a Multicast Traffic Indication (MTI) field indicating whether multicast data corresponding to the MGID and the FID included in the ranging request message are present and an multicast transmission start time (MTST) field indicating a time when multicast data are transmitted. In addition, the ranging response message may include a new MGID and FID in a case in which it is necessary to update the MGID and the FID.

In a case in which an MTI field of the ranging response message is set to '1' and the ranging response message includes the MGID and the MTST field, the M2M device may receive multicast data at a time indicated by the MTST field. In a case in which the MTI field of the ranging response message is set to '1' but the ranging response message does not include the MTST field, on the other hand, the M2M device may wait for multicast data to be received up to the next paging listening interval (S760).

Otherwise, in a case in which the M2M device receives a ranging response message including an MTI field set to 1, the M2M device may start a specific timer and waits for multicast data to be received until the timer ends. When the timer ends, the M2M device reenters an idle mode.

6. Generalization of Reliable Control Information Transmission Methods

Hereinafter, generalized methods that are capable of applying the embodiments of the present invention as described above to a general mobile station as well as an M2M device and, in addition, to unicast data as well as multicast data will be described. In the following description, the term M2M device is used for the convenience of description. However, the present invention may be applied to a general mobile station (MS). In addition, the term 'data' expressed in the following description is used as including both as multicast data and unicast data. In addition, it is assumed that embodiments which will hereinafter be described include transmission and reception of the PGID-Info message previously described with reference to FIGS. 3 to 7.

Figure 8:
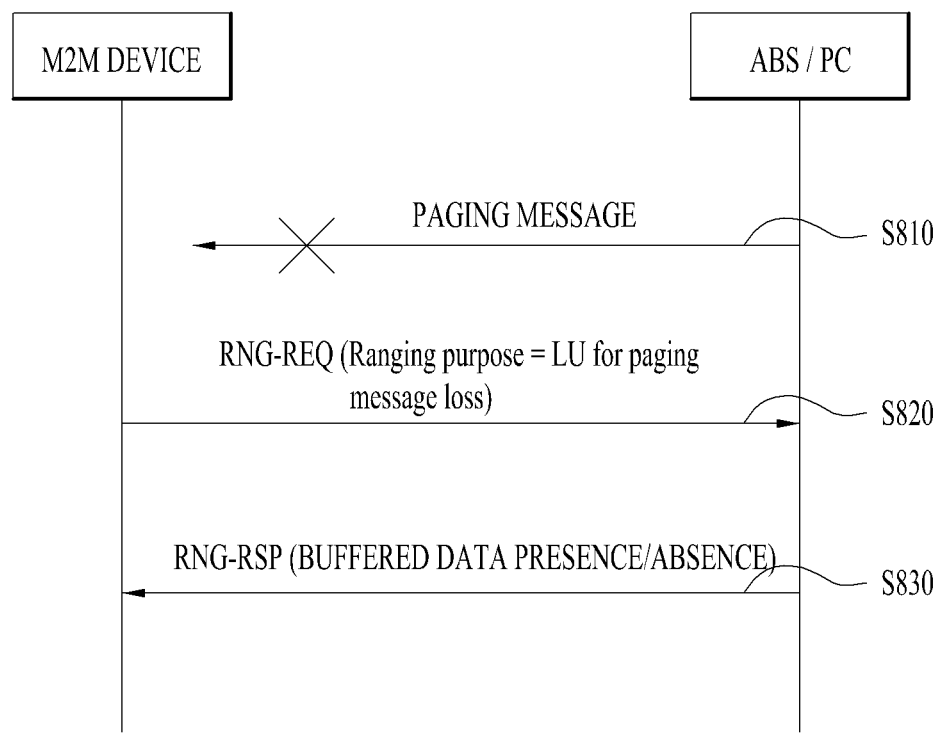
FIG. 8 is a view showing an example of a reliable data transmission method according to an embodiment of the present invention.

FIG. 8 is a view showing an example of a reliable data transmission method according to an embodiment of the present invention.

In a case in which an M2M device in an idle mode determines that the M2M device has not normally received a paging message (S810), the M2M device may perform a process of confirming whether a base station (or a paging controller (PC)) has data to be transmitted to the M2M device through a location update process.

Consequently, the M2M device transmits a ranging request message to the base station in order to perform a location update process. At this time, the ranging request message includes one or more selected from among a Paging Purpose Indication field indicating Paging Message Loss, an MGID for identifying an M2M group to which the M2M device belongs, and an identifier indicating the M2M device (S820).

Upon receiving the ranging request message including the paging purpose indication field indicating the paging message reception error, the base station (or the PC) confirms whether data to be transmitted to the M2M device are present. Subsequently, the base station transmits a ranging response message including a field indicating whether buffered data, indicating whether data to be transmitted to the M2M device are present, are present to the M2M device (S830).

Figure 9:
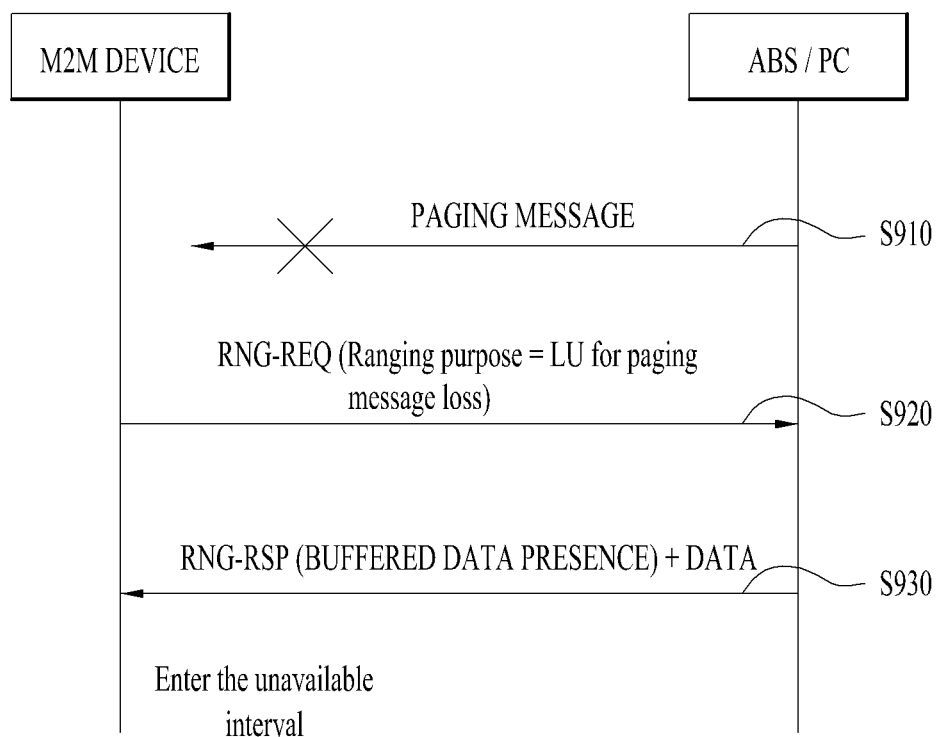
FIG. 9 is a view showing another example of a reliable data transmission method according to an embodiment of the present invention.

FIG. 9 is a view showing another example of a reliable data transmission method according to an embodiment of the present invention.

A description of step S910 and step S920 of FIG. 9 is replaced with that of step S810 and step S820 of FIG. 8.

Referring to FIG. 9, in a case in which data to be transmitted to the M2M device are present, the base station transmits the data to the M2M device together with a ranging response message including a field indicating that data to be transmitted are present. The M2M device, having received the ranging response message, may confirm that the base station has data to be transmitted. Upon receiving the data, the M2M device enters an unavailable interval (S930). At this time, the data may be transmitted at a different time than the ranging response message.

Figure 10:
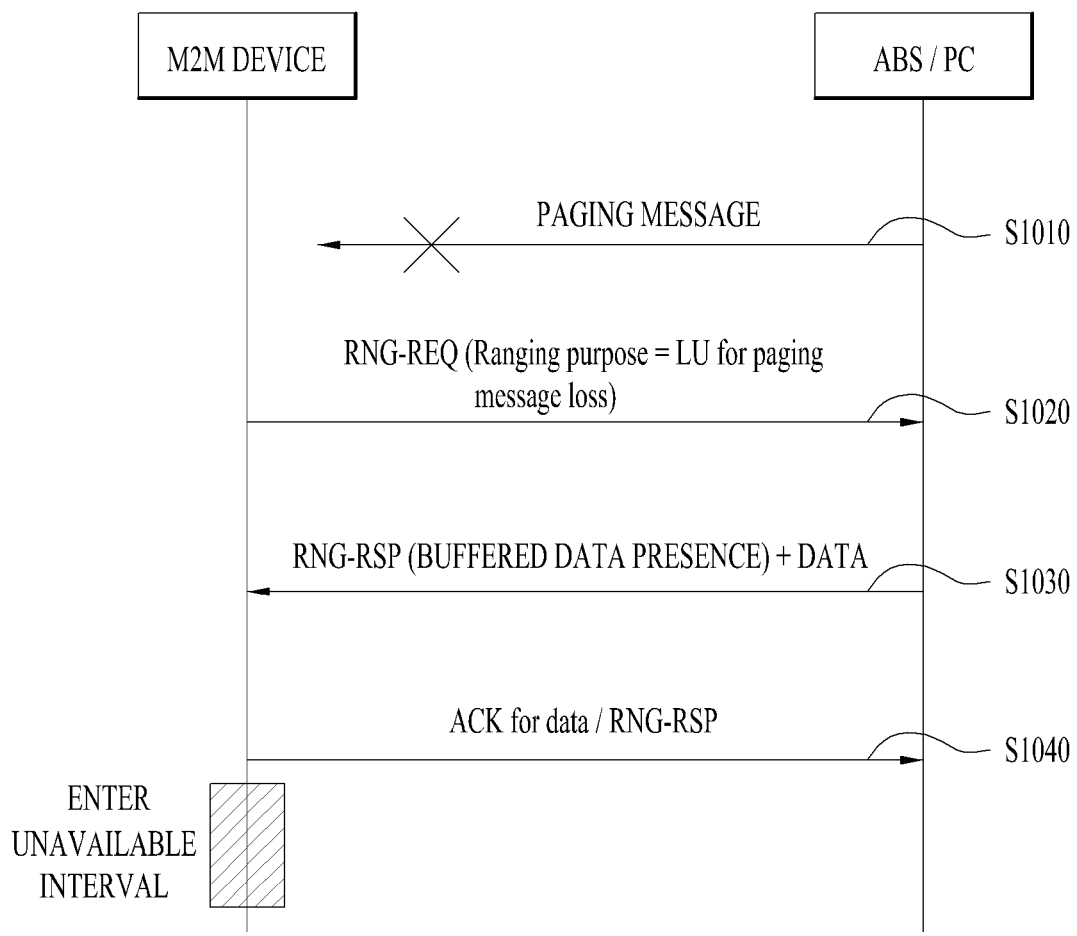
FIG. 10 is a view showing another example of a reliable data transmission method according to an embodiment of the present invention.

FIG. 10 is a view showing another example of a reliable data transmission method according to an embodiment of the present invention.

FIG. 10 shows a method of transmitting a reception confirmation message of the data to the base station after all processes of FIG. 9 are performed. In case of FIG. 9, however, the base station cannot know whether the M2M device has normally received all the corresponding messages. Accordingly, FIG. 10 proposes a method of solving this problem. A description of step S1010 to step S1030 of FIG. 10 is replaced with that of step S910 to step S930 of FIG. 9.

Referring to FIG. 10, the M2M device does not enter an idle mode immediately after reception of the data but transmits a reception confirmation response message indicating whether the data and the ranging response message have been normally received to the base station (S1040).

Upon receiving a message (or a header) indicating NACK, therefore, the base station may retransmit data. Upon receiving a message (or a header) indicating ACK, on the other hand, the base station may complete transmission of data. At this time, the message including ACK may be an ACK message for a MAC control message and/or an ACK message for data reception.

Figure 11:
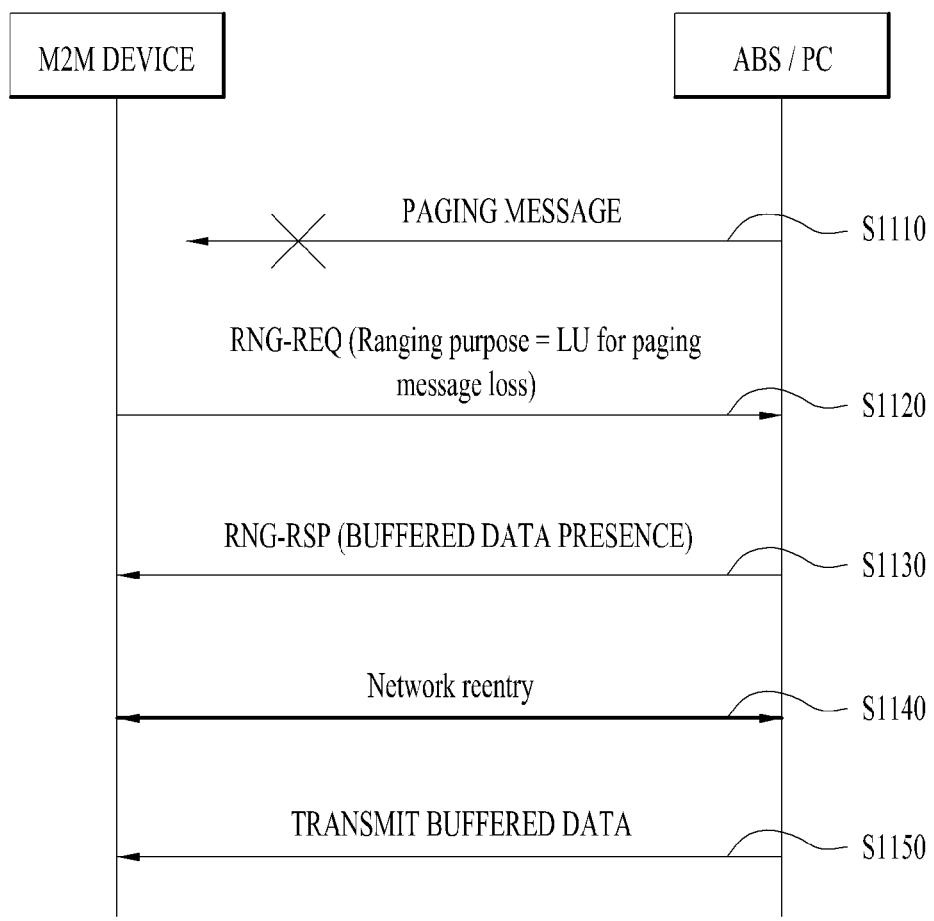
FIG. 11 is a view showing another example of a reliable data transmission method according to an embodiment of the present invention.

FIG. 11 is a view showing another example of a reliable data transmission method according to an embodiment of the present invention.

Step S1110 and step S1120 of FIG. 11 are identical to step S1010 and step S1020 of FIG. 10 and thus a description thereof will be omitted. In FIG. 11, however, when the base station transmits a ranging response message in response to a ranging request message, the base station does not transmit data even when the data are present unlike FIG. 10 but transmits only a ranging response message including a field indicating that the data are present (S1130).

In this case, the M2M device and the base station perform a ranging process for performing a network reentry process to enter a normal mode (S1140).

Subsequently, the M2M device may receive data from the base station at the normal mode (S1150).

Figure 12:
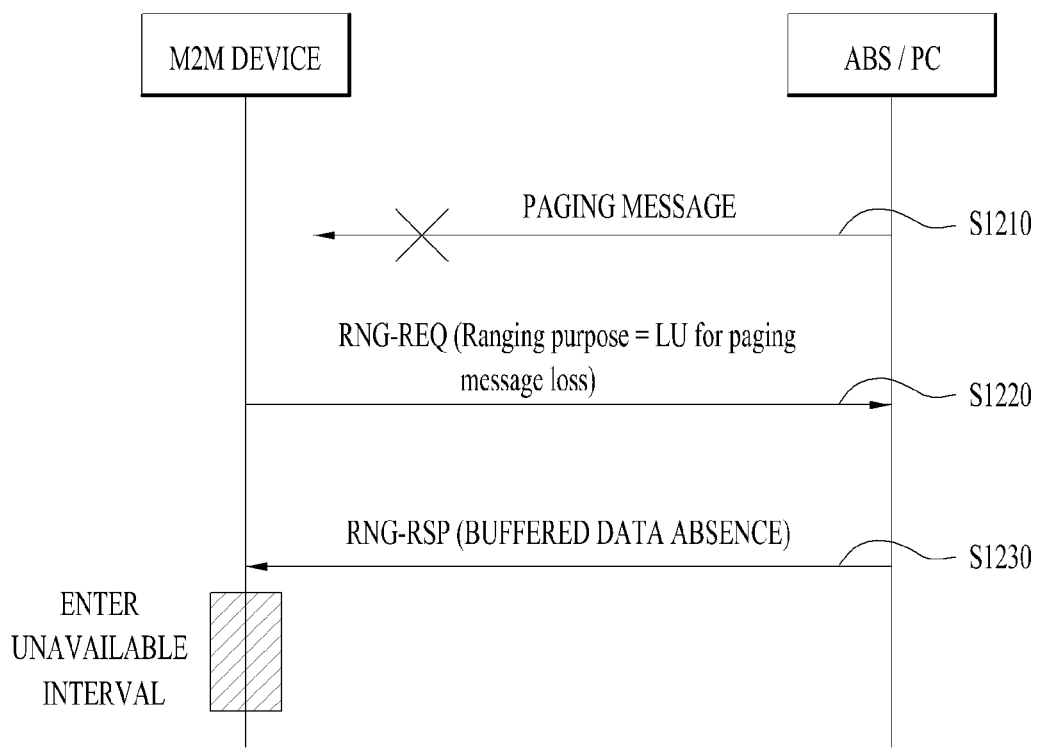
FIG. 12 is a view showing a further example of a reliable data transmission method according to an embodiment of the present invention.

FIG. 12 is a view showing a further example of a reliable data transmission method according to an embodiment of the present invention.

In a case in which an M2M device in an idle mode determines that the M2M device has not normally received a paging message (S1210), the M2M device may perform a process of confirming whether a base station (or a paging controller (PC)) has data to be transmitted to the M2M device through a location update process.

Consequently, the M2M device transmits a ranging request message to the base station in order to perform a location update process. At this time, the ranging request message includes one or more selected from among a Paging Purpose Indication field indicating Paging Message Loss, an MGID for identifying an M2M group to which the M2M device belongs, and an identifier indicating the M2M device (S1220).

Upon receiving the ranging request message including the paging purpose indication field indicating the paging message reception error, the base station (or the PC) confirms whether data to be transmitted to the M2M device are present. Subsequently, the base station transmits a ranging response message including a field indicating whether buffered data, indicating whether data to be transmitted to the M2M device are present, are present to the M2M device. In a case in which the base station does not have data to be transmitted to the M2M, on the other hand, the base station transmits a ranging response message including a field indicating that buffered data are absent to the M2M device. Upon receiving the ranging response message, the M2M device immediately enters an unavailable interval (S1230).

The present invention may be carried out in other specific ways than those set forth herein without departing from the spirit and essential characteristics of the present invention. The above embodiments are therefore to be construed in all aspects as illustrative and not restrictive. The scope of the invention should be determined by rational interpretation of the appended claims and all changes coming within the equivalency range of the appended claims are intended to be embraced therein. It will be obvious that claims that do not explicitly cite each other in the appended claims may be presented in combination as an exemplary embodiment of the present invention or included as a new claim by subsequent amendment after the application is filed.

INDUSTRIAL APPLICABILITY

The embodiments of the present invention may be applied to various wireless access systems. Examples of the wireless access systems may include 3rd Generation Partnership Project (3GPP), 3GPP2 and/or Institute of Electrical and Electronic Engineers 802 (IEEE 802.xx) systems. In addition, the embodiments of the present invention may be applied to all technical fields utilizing the above wireless access systems in addition to the above wireless access systems.

The invention claimed is:

1. A method of a machine to machine (M2M) device in an idle mode receiving multicast data in a wireless access system, the multicast data receiving method comprising:
receiving
    a paging group identifier information message comprising a multicast traffic indication (MTI) field indicating whether a paging message comprising control information associated with the multicast data is to be transmitted,
    an M2M group identifier (MGID) for identifying an M2M group to which the M2M device belongs, and
    a flow identifier (FID) for identifying a multicast connection between the M2M device and a base station with the MGID;
monitoring a paging frame to receive the paging message in a paging listening interval of the idle mode;
upon not receiving the paging message in the paging frame, transmitting
    a ranging request message comprising an M2M action code for confirming whether the paging message has been transmitted,
    the MGID, and
    the FID;
receiving a ranging response message comprising
    an M2M response code indicating whether the paging message has been transmitted and a multicast transmission start time (MTST) field indicating a transmission start time of a multicast data,
    a new MGID, and
    a new FID; and
receiving the multicast data based on the multicast transmission start time,
wherein, when a successive multicast traffic is present after a transmission of the multicast data, a MAC PDU (Media Access Control Protocol Data Unit) of the multicast data includes resource information about the successive multicast traffic, and
wherein the resource information included in the MAC PDU of the multicast data has a form of a MAC control message or an extended header.

2. The multicast data receiving method according to claim 1, wherein the MTI field indicates in which frame the paging message is to be transmitted in a bitmap form.

3. The multicast data receiving method according to claim 1, wherein the ranging request message further comprises a ranging purpose indication field indicating that the ranging request message is transmitted for location update associated with M2M multicast operation.

4. The multicast data receiving method according to claim 1, wherein the MTST field indicates one selected from among a superframe number, a frame number, and a subframe number.

5. A method of transmitting multicast data to an M2M device in an idle mode in a wireless access system, the multicast data transmitting method comprising:
transmitting a paging group identifier information message comprising
    a multicast traffic indication (MTI) field indicating whether a paging message comprising control information associated with the multicast data is to be transmitted,
    an M2M group identifier (MGID) for identifying an M2M group to which the M2M device belongs, and a flow identifier (FID) for identifying a multicast connection between the M2M device and a base station with the MGID;
transmitting the paging message;
receiving a ranging request message comprising
an M2M action code for confirming whether the paging message has been transmitted,
the MGID, and
the FID;
transmitting a ranging response message comprising
an M2M response code indicating that the paging message has been transmitted and a multicast transmission start time (MTST) field indicating a transmission start time of a multicast data,
a new MGID, and
a new FID; and
transmitting the multicast data based on the multicast transmission start time,
wherein, when a successive multicast traffic is present after a transmission of the multicast data, a MAC PDU (Media Access Control Protocol Data Unit) of the multicast data includes resource information about the successive multicast traffic, and
wherein the resource information included in the MAC PDU of the multicast data has a form of a MAC control message or an extended header.

6. The multicast data transmitting method according to claim 5, wherein the MTI field indicates in which frame the paging message is to be transmitted in a bitmap form.

7. The multicast data transmitting method according to claim 5, wherein the ranging request message further comprises a ranging purpose indication field indicating that the ranging request message is transmitted for location update associated with M2M multicast operation.

8. The multicast data transmitting method according to claim 5, wherein the MTST field indicates one selected from among a superframe number, a frame number, and a subframe number.

9. An M2M device for receiving multicast data in a wireless access system, comprising:
a transmitter;
a receiver; and
a processor operatively connected to the transmitter and the receiver, and configured to:
receive a paging group identifier information message comprising
a multicast traffic indication (MTI) field indicating whether a paging message comprising control information associated with the multicast data is to be transmitted,
an M2M group identifier (MGID) for identifying an M2M group to which the M2M device belongs, and
a flow identifier (FID) for identifying a multicast connection between the M2M device and a base station with the MGID,
monitor a paging frame using the processor to receive the paging message in a paging listening interval of an idle mode,
upon not receiving the paging message in the paging frame, transmit
a ranging request message comprising an M2M action code for confirming whether the paging message has been transmitted,
the MGID, and
the FID,
receive a ranging response message comprising
an M2M response code indicating whether the paging message has been transmitted and a multicast transmission start time (MTST) field indicating a transmission start time of a multicast data,
a new MGID, and
a new FID, and
receive the multicast data based on the multicast transmission start time,
wherein, when a successive multicast traffic is present after a transmission of the multicast data, a MAC PDU (Media Access Control Protocol Data Unit) of the multicast data includes resource information about the successive multicast traffic, and
wherein the resource information included in the MAC PDU of the multicast data has a form of a MAC control message or an extended header.

10. The M2M device according to claim 9, wherein the MTI field indicates in which frame the paging message is to be transmitted in a bitmap form.

11. The M2M device according to claim 9, wherein the ranging request message further comprises a ranging purpose indication field indicating that the ranging request message is transmitted for location update associated with M2M multicast operation.

12. The M2M device according to claim 9, wherein the MTST field indicates one selected from among a superframe number, a frame number, and a subframe number.

* * * * *